US012719850B2

(12) United States Patent
Nair et al.

(10) Patent No.: US 12,719,850 B2
(45) Date of Patent: *Aug. 25, 2026

(54) DISTRIBUTING CERTIFICATE BUNDLES ACCORDING TO DISTRIBUTION SCHEDULES

(71) Applicant: Oracle International Corporation, Redwood Shores, CA (US)

(72) Inventors: Sneha Sudhakaran Nair, Burnaby (CA); Tony Long, Edmonds, WA (US); Mauruthi Geetha Mohan, Seattle, WA (US); Akshay Krishnath Dagade, Austin, TX (US); Jakub Wojciak, North Vancouver (CA)

(73) Assignee: Oracle International Corporation, Redwood Shores, CA (US)

( * ) Notice: Subject to any disclaimer, the term of this patent is extended or adjusted under 35 U.S.C. 154(b) by 435 days.

This patent is subject to a terminal disclaimer.

(21) Appl. No.: 18/466,474

(22) Filed: Sep. 13, 2023

(65) Prior Publication Data

US 2025/0088499 A1 Mar. 13, 2025

(51) Int. Cl.
*H04L 9/40* (2022.01)

(52) U.S. Cl.
CPC ........ *H04L 63/0823* (2013.01); *H04L 63/104* (2013.01)

(58) Field of Classification Search
CPC . H04L 9/3263; H04L 9/3268; H04L 63/0823; H04L 63/104; G06F 21/33
See application file for complete search history.

(56) References Cited

U.S. PATENT DOCUMENTS 5,671,279 A 9/1997 Elgamal
7,272,714 B2 9/2007 Nagaratnam et al.
(Continued)

FOREIGN PATENT DOCUMENTS

CN 112019477 A 12/2020
CN 114884963 A 8/2022
(Continued)

OTHER PUBLICATIONS

M. S. Zefreh, A. Fanian, S. M. Sajadieh, M. Berenjkoub and P. Khadivi, "A Distributed Certificate Authority and Key Establishment Protocol for Mobile Ad Hoc Networks," 2008 10th International Conference on Advanced Communication Technology, Gangwon, Korea (South), 2008, pp. 1157-1162. (Year: 2008).*
(Continued)

*Primary Examiner* — Jung W Kim
*Assistant Examiner* — Sameera Wickramasuriya
(74) *Attorney, Agent, or Firm* — Invoke

(57) ABSTRACT

Operations of a certificate bundle distribution service may include: detecting a trigger condition to distribute a certificate bundle that includes a set of one or more certificate authority certificates; partitioning each particular network entity of a plurality of network entities associated with a computer network into one of a plurality of certificate distribution groups based on a network address of the particular network entity, in which each particular certificate distribution group includes a particular subset of network entities from the plurality of network entities; selecting a particular certificate distribution group, of the plurality of certificate distribution groups, for distribution of the certificate bundle; and transmitting the certificate bundle to the particular subset of network entities in the particular certificate distribution group.

29 Claims, 10 Drawing Sheets

(56) References Cited

U.S. PATENT DOCUMENTS 7,644,270 B1 1/2010 Cherukumudi et al.
8,176,328 B2 5/2012 Chen et al.
8,452,958 B2 5/2013 Sun et al.
9,172,543 B2 10/2015 Wnuk
9,197,630 B2 11/2015 Sharif et al.
9,231,933 B1 1/2016 Shenoy et al.
9,252,958 B1 2/2016 Tempel et al.
9,485,101 B2 11/2016 Bowen
9,660,978 B1 5/2017 Truskovsky et al.
9,680,813 B2 6/2017 Sade et al.
9,794,249 B1 10/2017 Truskovsky et al.
9,882,727 B1 1/2018 Veladanda et al.
10,021,084 B2 7/2018 Matthews et al.
10,212,147 B2 2/2019 Buendgen et al.
10,425,401 B1 9/2019 Pecen et al.
10,439,825 B1 10/2019 Meyer et al.
10,447,683 B1 * 10/2019 Loladia ................. H04W 12/71
10,469,518 B1 11/2019 Natanzon et al.
10,621,577 B2 4/2020 Castinado et al.
10,652,030 B1 * 5/2020 Levy ..................... H04L 9/3268
10,764,263 B2 9/2020 Rossi
10,771,261 B1 9/2020 Lazar et al.
10,812,276 B2 * 10/2020 Bojjireddy et al. .... H04L 9/083
10,848,323 B2 11/2020 Barr, III et al.
11,153,103 B2 10/2021 Fynaardt et al.
11,190,504 B1 11/2021 Ah Kun et al.
11,196,570 B2 12/2021 Borne-Pons et al.
11,310,059 B2 4/2022 Leibmann et al.
11,362,843 B1 * 6/2022 Jiang ..................... H04L 9/0891
11,368,314 B2 6/2022 Ray et al.
11,388,594 B2 7/2022 Uy et al.
11,438,325 B2 9/2022 Begun et al.
11,477,011 B1 10/2022 Pelton et al.
11,533,185 B1 12/2022 Sharma et al.
11,627,123 B2 4/2023 Stayskal et al.
11,706,038 B1 7/2023 Thakore et al.
11,706,207 B1 7/2023 Fynaardt
11,888,997 B1 1/2024 Bowen et al.
12,088,738 B2 9/2024 Rosenthol et al.
12,323,466 B1 6/2025 Miseiko et al.
12,361,110 B1 7/2025 Subramanian et al.
12,380,443 B1 8/2025 Edwards et al.
2002/0007346 A1 1/2002 Qiu et al.
2002/0029200 A1 3/2002 Dulin et al.
2002/0174066 A1 11/2002 Kleckner et al.
2003/0037234 A1 2/2003 Fu et al.
2006/0047965 A1 3/2006 Thayer
2006/0101510 A1 5/2006 Kadyk et al.
2007/0005956 A1 1/2007 Zilinskas et al.
2007/0016782 A1 1/2007 Crall et al.
2007/0147619 A1 6/2007 Bellows et al.
2010/0030897 A1 2/2010 Stradling
2010/0325429 A1 12/2010 Saha et al.
2011/0113239 A1 * 5/2011 Fu ....................... H04L 63/0823 713/156
2011/0238986 A1 * 9/2011 Kherani .............. H04L 63/0823 713/168
2012/0036220 A1 2/2012 Dare et al.
2012/0240192 A1 9/2012 Orazi et al.
2012/0246466 A1 * 9/2012 Salvarani ................ H04L 9/007 713/156
2012/0278614 A1 11/2012 Choi
2013/0086642 A1 4/2013 Resch et al.
2013/0179676 A1 7/2013 Hamid
2013/0262857 A1 10/2013 Neuman et al.
2014/0298419 A1 10/2014 Boubez et al.
2014/0354405 A1 12/2014 Kocher et al.
2015/0095995 A1 4/2015 Bhalerao
2015/0135299 A1 5/2015 Liang et al.
2015/0215308 A1 7/2015 Manolov et al.
2015/0279132 A1 10/2015 Perotti
2015/0288528 A1 10/2015 Cho et al.
2015/0334110 A1 11/2015 Bishop et al.
2015/0381374 A1 12/2015 Zmbik
2016/0277923 A1 9/2016 Steffey et al.
2016/0352521 A1 12/2016 Choi et al.
2017/0039373 A1 2/2017 Sasin et al.
2017/0126667 A1 5/2017 Bishop et al.
2017/0171191 A1 * 6/2017 Cignetti .................. H04L 9/321
2017/0177324 A1 6/2017 Frank et al.
2017/0222981 A1 8/2017 Srivastav et al.
2017/0279807 A1 9/2017 Bermdez
2017/0317837 A1 11/2017 Alrawais et al.
2017/0338967 A1 11/2017 Lewison et al.
2017/0373860 A1 12/2017 Kshirsagar et al.
2018/0019993 A1 1/2018 Kravitz et al.
2018/0083966 A1 3/2018 Zhou et al.
2018/0102904 A1 4/2018 Lin et al.
2018/0287804 A1 10/2018 Geisbush
2019/0026804 A1 1/2019 Yin
2019/0149342 A1 * 5/2019 Fynaardt ............... H04L 9/0891 713/156
2019/0165950 A1 5/2019 Ibrahim
2019/0166635 A1 5/2019 Mccolgan et al.
2019/0347406 A1 11/2019 Lev-Ran
2019/0349402 A1 11/2019 Shukla et al.
2019/0356494 A1 11/2019 Chmara et al.
2019/0356817 A1 11/2019 Bush et al.
2019/0363895 A1 11/2019 Barr et al.
2019/0372783 A1 12/2019 Martinez et al.
2020/0021575 A1 1/2020 Rezvani et al.
2020/0092095 A1 3/2020 Yang et al.
2020/0150972 A1 * 5/2020 Ketkar ................ G06F 9/44505
2020/0274718 A1 8/2020 Hwang et al.
2020/0274862 A1 8/2020 Varvarezis et al.
2020/0382323 A1 12/2020 Keselman et al.
2020/0396089 A1 12/2020 Guo et al.
2021/0034767 A1 2/2021 Free et al.
2021/0051028 A1 2/2021 Kapon et al.
2021/0126801 A1 4/2021 Nix
2021/0144017 A1 5/2021 Li et al.
2021/0152547 A1 5/2021 Barhudarian et al.
2021/0211307 A1 7/2021 Statia et al.
2021/0218723 A1 7/2021 Lekov et al.
2021/0274348 A1 9/2021 Yoon et al.
2021/0297259 A1 9/2021 Rahn et al.
2021/0328814 A1 10/2021 Wei et al.
2021/0392002 A1 * 12/2021 Gray ..................... H04L 9/0643
2021/0409403 A1 12/2021 Lewin et al.
2021/0409409 A1 12/2021 Palanisamy
2022/0014522 A1 1/2022 Thomas et al.
2022/0029988 A1 1/2022 Levin et al.
2022/0038894 A1 2/2022 Yoon et al.
2022/0116229 A1 4/2022 Jones et al.
2022/0123951 A1 4/2022 Lutz et al.
2022/0141004 A1 * 5/2022 Murray ................. H04L 9/0861 713/171
2022/0141085 A1 5/2022 Singhal et al.
2022/0150238 A1 5/2022 Bhalerao
2022/0239503 A1 7/2022 Mallikarjuna et al.
2022/0264301 A1 8/2022 Martinez et al.
2022/0393886 A1 12/2022 Williams et al.
2023/0007474 A1 1/2023 Ni et al.
2023/0032867 A1 2/2023 Peddada et al.
2023/0049095 A1 2/2023 Rangaraj
2023/0062888 A1 3/2023 Colombano
2023/0109231 A1 4/2023 Adogla et al.
2023/0121514 A1 4/2023 Smith
2023/0208655 A1 6/2023 Statia et al.
2023/0237155 A1 7/2023 Jacquin et al.
2023/0239163 A1 7/2023 Liu et al.
2023/0291574 A1 9/2023 Held et al.
2023/0291577 A1 9/2023 Thai et al.
2023/0401307 A1 12/2023 Pop et al.
2023/0412397 A1 12/2023 Gollent et al.
2024/0015508 A1 1/2024 Yoon et al.
2024/0020373 A1 1/2024 Ivanov et al.
2024/0031146 A1 1/2024 Marosi-Bauer et al.
2024/0097919 A1 3/2024 Qiu et al.
2024/0104192 A1 3/2024 Kalle et al.
2024/0106886 A1 3/2024 Roy et al.
2024/0121603 A1 4/2024 Yoon et al.
2024/0146543 A1 5/2024 Sahoo et al.
2024/0333640 A1 10/2024 Shevade et al.

(56) References Cited

U.S. PATENT DOCUMENTS

| | | | | |
|---|---|---|---|---|
| 2024/0356763 | A1 | 10/2024 | Goldberg et al. | |
| 2024/0364540 | A1 | 10/2024 | Sai et al. | |
| 2024/0372731 | A1 | 11/2024 | Kobel et al. | |
| 2024/0388510 | A1 | 11/2024 | Madtha et al. | |
| 2024/0427642 | A1 | 12/2024 | Punreddy et al. | |
| 2024/0430249 | A1 | 12/2024 | Singh et al. | |
| 2025/0030561 | A1 | 1/2025 | Long et al. | |
| 2025/0088373 | A1 | 3/2025 | Uzun et al. | |
| 2025/0097211 | A1 * | 3/2025 | Uzun .................. | H04L 63/0823 |
| 2025/0133401 | A1 | 4/2025 | Lee et al. | |

FOREIGN PATENT DOCUMENTS

| | | | |
|---|---|---|---|
| EP | 1251670 | A2 | 10/2002 |
| EP | 2267970 | A2 | 12/2010 |
| EP | 2854349 | A1 | 4/2015 |
| EP | 4000296 | A1 | 5/2022 |
| EP | 3772208 | B1 | 9/2024 |
| KR | 10-2011-0045459 | A | 5/2011 |
| WO | 2006/122024 | A2 | 11/2006 |
| WO | 2007/117293 | A2 | 10/2007 |
| WO | 2022/103890 | A1 | 5/2022 |
| WO | 2022/121461 | A1 | 6/2022 |
| WO | 2022/133026 | A1 | 6/2022 |
| WO | 2023/240360 | A1 | 12/2023 |
| WO | 2025/059187 | A1 | 3/2025 |

OTHER PUBLICATIONS

"About Azure Key Vault certificates", Retrieved from https://learn.microsoft.com/en-us/azure/key-vault/certificates/about-certificates, Feb. 8, 2023, pp. 1-8.

"About the Expressway", Aug. 17, 2022. pp. 1-12.

"Automated certificate management for TLS certificates", Retrieved from https://docs.servicenow.com/en-US/bundle/utah-it-operations-management/page/product/discovery/concept/automated-cert-requests.html, Retrieved on May 4, 2023, pp. 1-4.

"AWS Certificate Manager FAQs", Retrieved from https://aws.amazon.com/certificate-manager/faqs/, Retrieved on Mar. 24, 2023, pp. 1-17.

"Azure Instance Metadata Service", Retrieved from https://learn.microsoft.com/en-us/azure/virtual-machines/instance-metadata-service?tabs=windows, Mar. 15, 2023, pp. 1-42.

"Cisco Expressway Certificate Creation and Use Deployment Guide", Feb. 23, 2021, p. 10.

"Deploying the CA bundle iApp", Retrieved from https://www.f5.com/pdf/deployment-guides/f5-ca-bundle-dg.pdf, Dec. 14, 2017, pp. 1-9.

"DigiCert Public Key Infrastructure (PKI) Platform", 2019, p. 15.

"Get started with Key Vault certificates", Retrieved from https://learn.microsoft.com/en-us/azure/key-vault/certificates/certificate-scenarios, Retrieved on Feb. 1, 2023, pp. 1-6.

"High Availability using Patching and Rolling AP Upgrade on Cisco Catalyst 9800 Wireless Controllers", Copyright 2020, pp. 1-41.

"Manage Certificate Revocation Lists (CRLs)", Jul. 23, 2021, pp. 1-4.

"PKI secrets engine", Retrieved from https://developer.hashicorp.com/vault/docs/secrets/pki, Retrieved on May 4, 2023, pp. 1-3.

"Planning a certificate revocation list (CRL)", Retrieved from https://docs.aws.amazon.com/privateca/latest/userguide/crl-planning.html, Retrieved on Jul. 28, 2023, p. 11.

"Release app updates with staged rollouts", Retrieved from https://support.google.com/googleplay/android-developer/answer/6346149?hl=en#zippy=%2Crelease-a-staged-rollout-to-specific-countries, Retrieved on Apr. 27, 2023, pp. 1-2.

"Release Your App Update in a Staged Rollout", Retrieved from https://developer.amazon.com/docs/app-submission/release-updates-in-staged-rollouts.html, Retrieved on Apr. 27, 2023, pp. 1-18.

"Rotate Security Certificates", Retrieved from https://www.cockroachlabs.com/docs/stable/rotate-certificates, Retrieved on May 4, 2023, pp. 1-6.

"Rotating the Root CA and Leaf Certificates", Retrieved from https://docs.pivotal.io/ops-manager/2-4/security/pcf-infrastructure/rotate-cas-and-leaf-certs.html, Nov. 5, 2020, pp. 1-9.

"Staged upgrade", Retrieved from https://www.ibm.com/docs/en/order-management-sw/9.4.0?topic=migrating-staged-upgrade, Mar. 2, 2021, pp. 1-3.

"Troubleshoot SSL certificates", Retrieved from https://cloud.google.com/load-balancing/docs/ssl-certificates/troubleshooting, Retrieved on Mar. 24, 2023, pp. 1-8.

"Tutorial: Configure certificate auto-rotation in Key Vault", Retrieved from https://learn.microsoft.com/en-us/azure/key-vault/certificates/tutorial-rotate-certificates, Feb. 27, 2023, pp. 1-6.

"Updating the CA bundle", Retrieved from https://docs.openshift.com/container-platform/4.9/security/certificates/updating-ca-bundle.html#ca-bundle-understanding_updating-ca-bundle, Retrieved on Mar. 24, 2023, pp. 1-2.

"Updating your private CA", Retrieved from https://docs.aws.amazon.com/privateca/latest/userguide/PCAUpdateCA.html, Retrieved on Mar. 24, 2023, pp. 1-4.

"Use self-managed SSL certificates", Retrieved from https://cloud.google.com/load-balancing/docs/ssl-certificates/self-managed-certs, Aug. 15, 2023, p. 13.

"vSphere Security", vmware, Update 3, Mar. 21, 2023, pp. 1-426.

"Working with Hosts", Retrieved from https://docs.cloudstack.apache.org/projects/archived-cloudstack-administration/en/latest/hosts.html, Retrieved on Mar. 24, 2023, pp. 1-7.

Atutxa et al., "Improving efficiency and security of IIoT communications using in-network validation of server certificate", Computers in Industry, vol. 144, Jan. 2023, 103802, p. 30.

Bigelow S.J., "Rolling deployment", Retrieved from https://www.techtarget.com/searchitoperations/definition/rolling-deployment, Jan. 2023, p. 4.

Este-Gracias S., "Rotate your CA seamlessly using a Vault PKI", Retrieved from https://sestegra.medium.com/rotate-your-ca-seamlessly-using-a-vault-pki-9262228b4afb Sep. 29, 2022, pp. 1-49.

Ghanmi et al., "A Secure Data Storage in Multi-cloud Architecture Using Blowfish Encryption Algorithm", Advanced Information Networking and Applications, Mar. 2022, pp. 398-408.

Jamal F., "Zero Trust for SSH—Secure One-click Server Access for Software Engineering Teams", Retrieved from https://www.banyansecurity.io/blog/zero-trust-for-ssh/, Oct. 28, 2020, pp. 1-7.

Manjusha R. et al., "Secure Authentication and Access System for Cloud Computing Auditing Services Using Associated Digital Certificate", Indian Journal of Science and Technology, vol. 8 (S7), Apr. 2015, pp. 220-227.

Nexthop Team, "Updated: Creating a Certificate Revocation List Distribution Point for Your Internal Certification Authority", Retrieved from https://techcommunity.microsoft.com/t5/skype-for-business-blog/updated-creating-a-certificate-revocation-list-distribution/ba-p/620691, Dec. 17, 2012, p. 10.

Rowley J., "Google's Moving Forward Together Proposals for Root CA Policy: Rotating ICAS More Frequently", Retrieved from https://www.digicert.com/blog/googles-moving-forward-together-proposals-for-root-ca-policy, Mar. 22, 2023, pp. 1-11.

Subhayu, "Different Phases of a Certificate Lifecycle Management Process for a secure WPA2-Enterprise network", Certificate Lifecycle Management Oct. 6, 2022, p. 16.

Ylonen et al., "Security of Automated Access Management Using Secure Shell (SSH)", NISTIR 7966 (Draft), Aug. 2014, p. 43.

Albert Wasef et al., DCS: An Efficient Distributed-Certificate-Service Scheme for Vehicular Networks, Feb. 2010, IEEE, vol. 59, Issue: 2, pp. 533-549. (Year: 2010).

Artem Dinaburg et al., Ether: Malware Analysis via Hardware Virtualization Extensions, Oct. 27, 2008, ACM, pp. 51-62. (Year: 2008).

Capt James M. Hayes, Secure In-band Update of Trusted Certificates, Aug. 6, 2002, IEEE, pp. 1-6. (Year: 2002).

Kumagai et al., "Distributed Public Key Certificate-Issuing Infrastructure for Consortium Certificate Authority Using Distributed Ledger Technology", Security and Communication Networks, vol. 2023, Article ID 9559439, Jun. 7, 2023, pp. 1-20.

Marco Anisetti et al., Test-Based Security Certification of Composite Services, Dec. 4, 2018, vol. 13, Issue 1, pp. 1-43. (Year: 2018).

(56) References Cited

OTHER PUBLICATIONS

Yu et al., "A Cloud Certificate Authority Architecture for Virtual Machines with Trusted Platform Module", 2015 IEEE 17th International Conference on High Performance Computing and Communications, 2015 IEEE 7th International Symposium on Cyberspace Safety and Security, and 2015 IEEE 12th International Conference on Embedded Software and Systems, 2015, pp. 1377-1380.
Bingyu Li et al., Locally-Centralized Certificate Validation and Its Application in Desktop Virtualization Systems, Nov. 2, 2020, IEEE, vol. 16, pp. 1380-1395. (Year: 2020).
Jude Nelson et al., Syndicate: Virtual Cloud Storage through Provider Composition, Jun. 23, 2014, ACM, pp. 1-8. (Year: 2014).
Kathleen Nichols et al., Trust Schemas and ICN: Key to Secure Home IoT, Sep. 22, 2021, ACM, pp. 95-106. (Year: 2021).
Yi, Seunghee, (WO2023/227228 , "Method and Apparatus for Canary deployment in Gnodeb,"), Nov. 30. 2023. pp. 1-17. (Year: 2023).

* cited by examiner

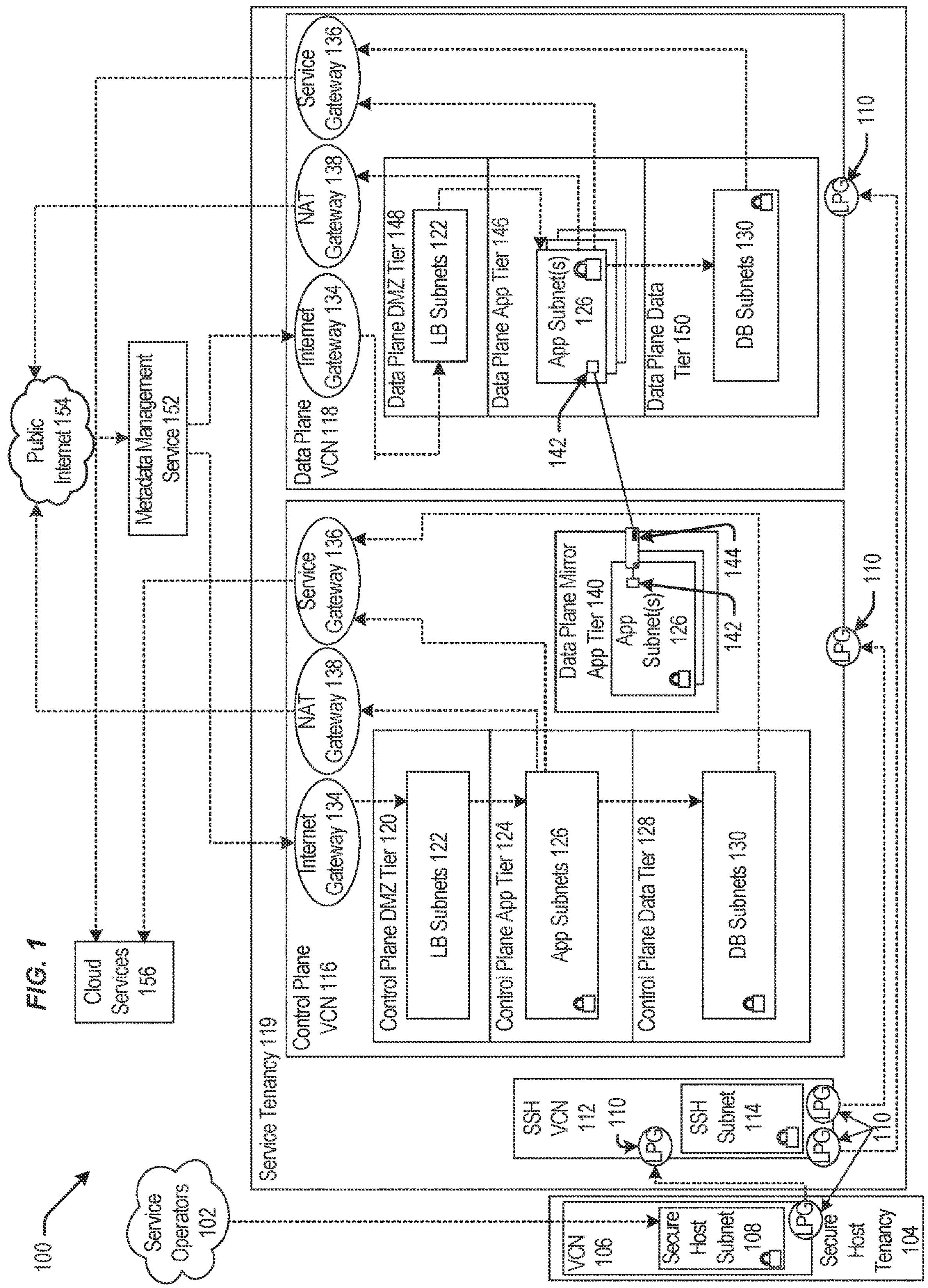

FIG. 1
100
Service Operators 102
Cloud Services 156
Public Internet 154
Metadata Management Service 152
Service Tenancy 119
Control Plane VCN 116
Internet Gateway 134
NAT Gateway 138
Service Gateway 136
Control Plane DMZ Tier 120
LB Subnets 122
Control Plane App Tier 124
App Subnets 126
Control Plane Data Tier 128
DB Subnets 130
Data Plane Mirror App Tier 140
App Subnet(s) 126
142
144
Data Plane VCN 118
Internet Gateway 134
NAT Gateway 138
Service Gateway 136
Data Plane DMZ Tier 148
LB Subnets 122
Data Plane App Tier 146
App Subnet(s) 126
142
Data Plane Data Tier 150
DB Subnets 130
SSH VCN 112
SSH Subnet 114
LPG
110
VCN 106
Secure Host Subnet 108
Secure Host Tenancy 104

200

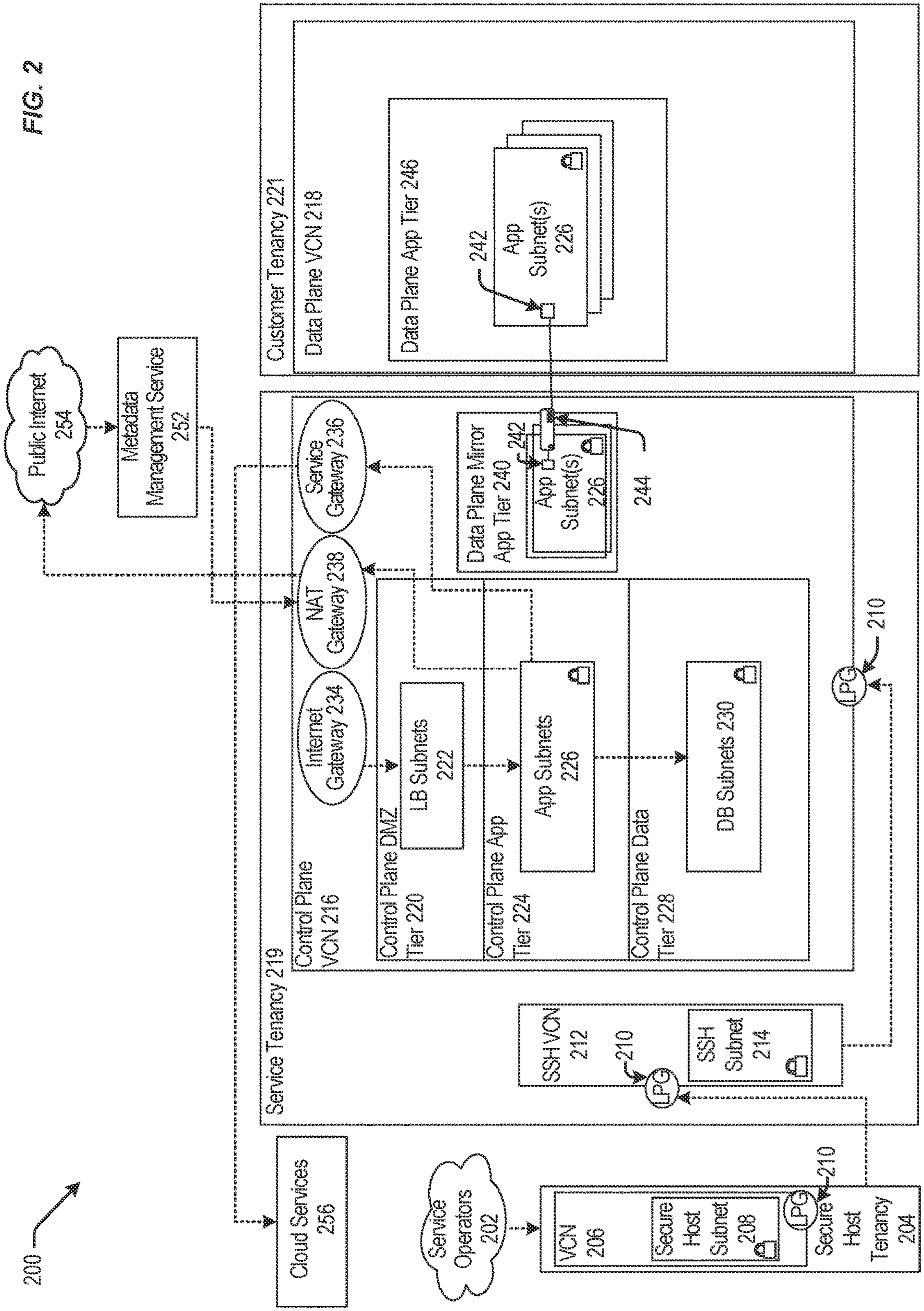

FIG. 2
Public Internet 254
Metadata Management Service 252
Cloud Services 256
Service Tenancy 219
Control Plane VCN 216
Internet Gateway 234
NAT Gateway 238
Service Gateway 236
Control Plane DMZ Tier 220
LB Subnets 222
Control Plane App Tier 224
App Subnets 226
Control Plane Data Tier 228
DB Subnets 230
Data Plane Mirror App Tier 240
242
App Subnet(s) 226
244
Customer Tenancy 221
Data Plane VCN 218
Data Plane App Tier 246
242
App Subnet(s) 226
Service Operators 202
VCN 206
Secure Host Subnet 208
LPG
Secure Host Tenancy 204
210
SSH VCN 212
210
LPG
SSH Subnet 214
LPG
210

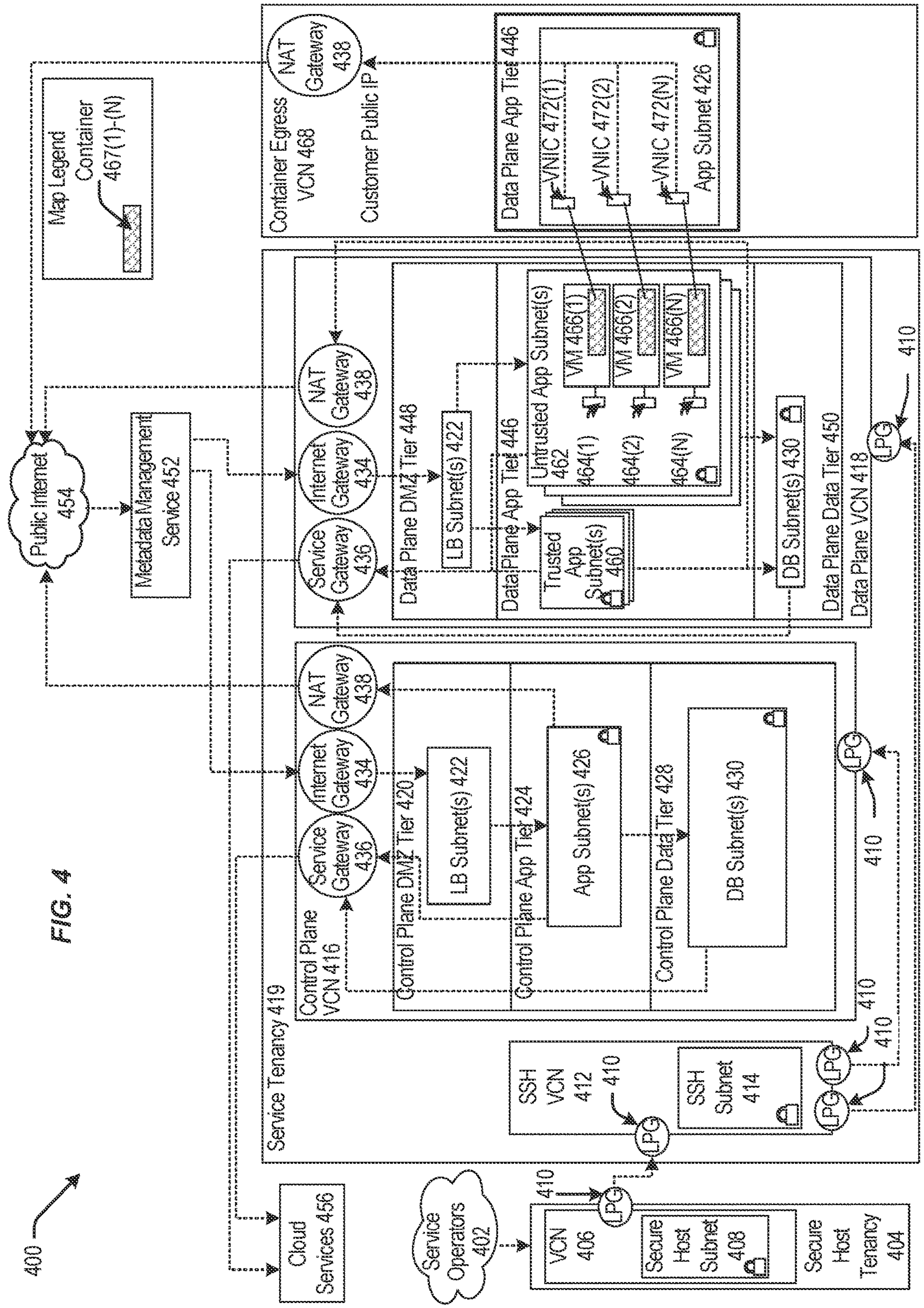
FIG. 4
400
Service Operators 402
VCN 406
Secure Host Subnet 408
Secure Host Tenancy 404
LPG
410
Cloud Services 456
Service Tenancy 419
SSH VCN 412
SSH Subnet 414
Control Plane VCN 416
Service Gateway 436
Internet Gateway 434
NAT Gateway 438
Control Plane DMZ Tier 420
LB Subnet(s) 422
Control Plane App Tier 424
App Subnet(s) 426
Control Plane Data Tier 428
DB Subnet(s) 430
Data Plane VCN 418
Data Plane DMZ Tier 448
Data Plane App Tier 446
Trusted App Subnet(s) 460
Untrusted App Subnet(s) 462
464(1)
464(2)
464(N)
VM 466(1)
VM 466(2)
VM 466(N)
Data Plane Data Tier 450
Public Internet 454
Metadata Management Service 452
Map Legend
Container 467(1)-(N)
Container Egress VCN 468
Customer Public IP
App Subnet 426
VNIC 472(1)
VNIC 472(2)
VNIC 472(N)

Stage 1: distribute a new certificate bundle including a new set of CA certificates to a set of network entities associated with a virtual cloud network

702

Has the new certificate bundle been successfully distributed?

No

704

Yes

Stage 2: activate new CA certificates in the new certificate bundle

706

Stage 3: distribute new entity certificates to the set of network entities

708

Have the new entity certificates been successfully distributed?

No

710

Yes

Stage 4: remove earlier CA certificates

712

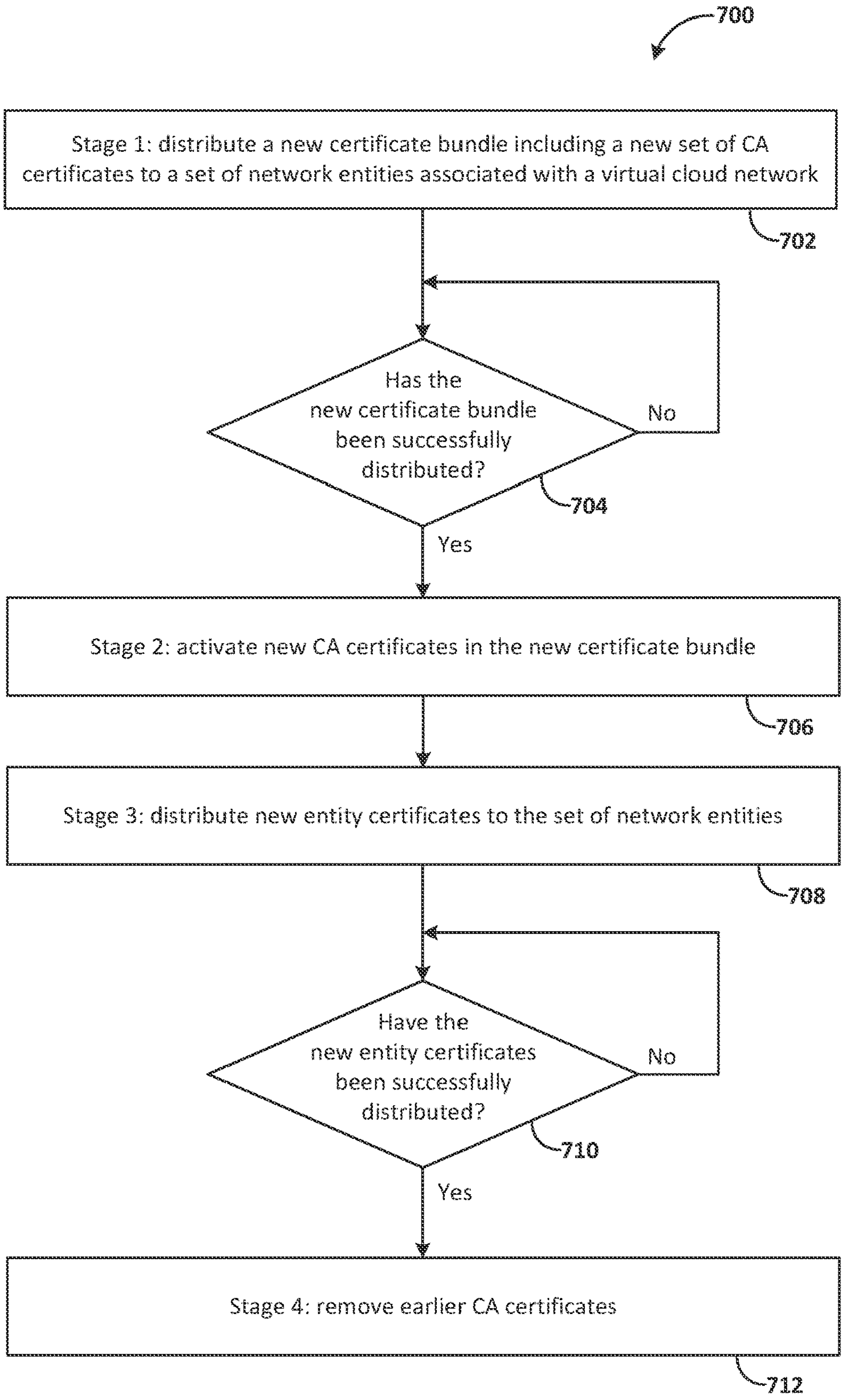

FIG. 7

DISTRIBUTING CERTIFICATE BUNDLES ACCORDING TO DISTRIBUTION SCHEDULES

TECHNICAL FIELD

The present disclosure relates to digital certificates used by network entities to authenticate other network entities. In particular, the present disclosure relates to distributing certificate bundles, that include certificate authority (CA) certificates, to network entities associated with a computer network.

BACKGROUND

A computer network, such as a virtual cloud network, includes network entities that communicate with one another. Communications between network entities may be performed in accordance with a security protocol whereby network entities authenticate one another by presenting a digital certificate. When a network entity presents a valid digital certificate to another network entity, the other network entity can trust that it is communicating with the network entity, as opposed to some unknown entity, based on a trust relationship with the CA that issued the digital certificate.

A digital certificate may be issued to a network entity by a CA. The digital certificate may include a digital signature generated using a private key of the CA that issued the digital certificate. The digital signature can be validated using CA certificate of the CA that includes a public key corresponding to the private key. Various CA certificates that may be utilized to validate digital certificates issued to various network entities may be included in a certificate bundle. The certificate bundle may be distributed to network entities throughout a computer network, such as a virtual cloud network. For example, a certificate bundle may be installed when initializing the computer network and/or when initializing various network entities on the computer network. Additionally, a certificate bundle may be updated or replaced from time-to-time, for example, to make new CA certificates available to the network entities and/or to remove old CA certificates.

The content of this background section should not be construed as prior art merely by virtue of its presence in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 1-4 are block diagrams illustrating patterns for implementing a cloud infrastructure as a service system in accordance with one or more embodiments;

FIG. 7 is a flowchart that illustrates an example certificate bundle distribution process for distributing a set of CA certificates to network entities associated with a virtual cloud network in accordance with one or more embodiments.

DETAILED DESCRIPTION

Figure 3:
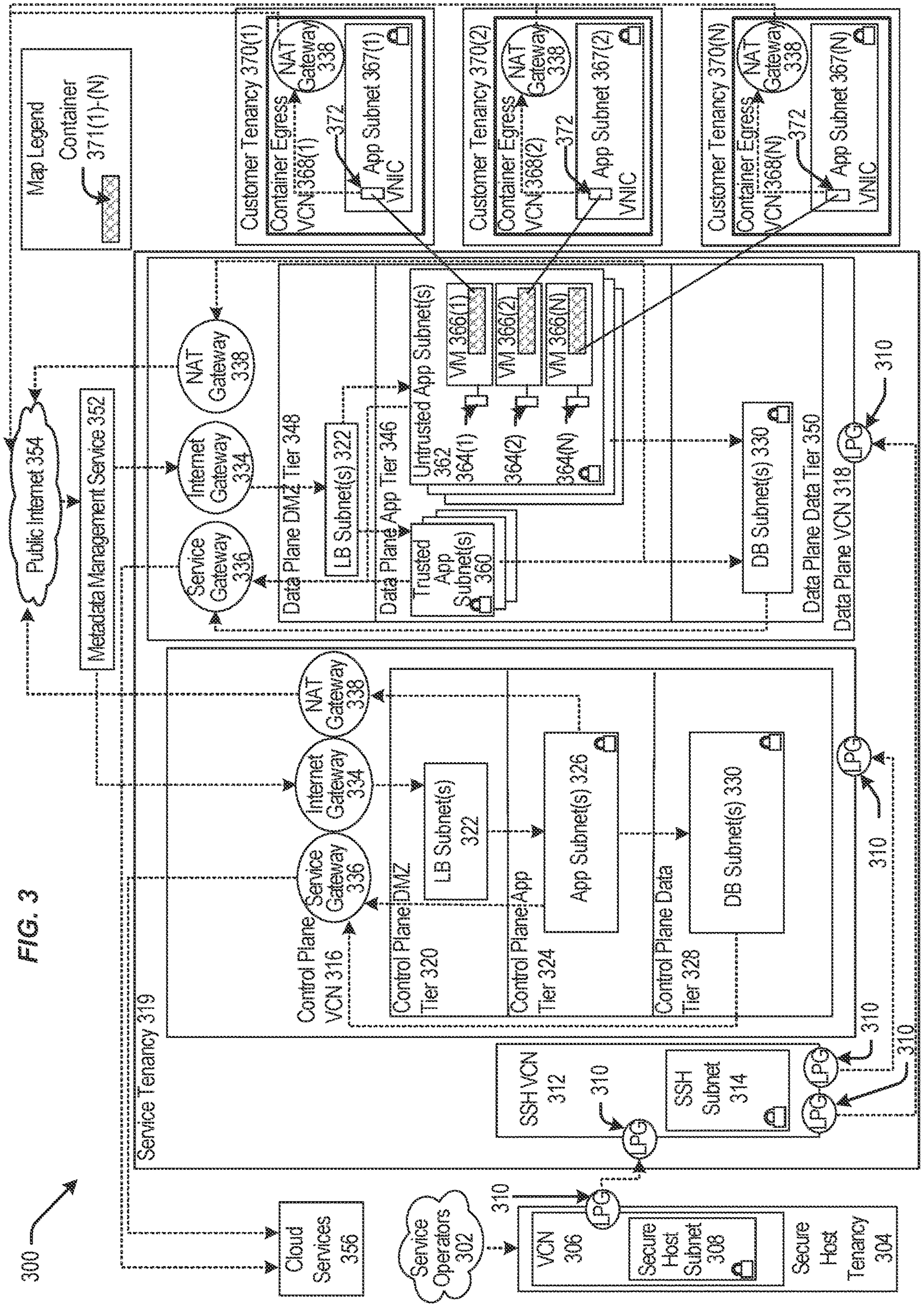

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention. Asymmetric 1. General Overview
2. Cloud Computing Technology
3. Computer System
4. Architectural Overview
5. Example Certificate Bundle Distribution Process
6. Example Certificate Bundle Distribution Operations
7. Authenticating Network Entities
8. Miscellaneous; Extensions

1. General Overview

One or more embodiments partition network entities associated with a computer network, such as a virtual cloud network, into certificate distribution groups based on a network address of the particular network entity. A randomization function may be applied to the network address of the particular network entity to determine the particular certificate distribution group for the particular network entity. As a result of the randomization function, each particular certificate distribution group may include a random subset of network entities. A certificate bundle that includes a set of one or more CA certificates may be distributed to the certificate distribution groups in a series of release phases that respectively correspond to a particular certificate distribution group. By distributing a certificate bundle sequentially to a series of certificate distribution groups, the possibility of an unsuccessful distribution may be confined to the subset of network entities associated with a particular certificate distribution group. Further, a successful distribution may be confirmed with respect to a particular certificate distribution group prior to proceeding with distribution of the certificate bundle to a next certificate distribution group in the sequence.

One or more embodiments described in this Specification and/or recited in the claims may not be included in this General Overview section.

2. Cloud Computing Technology

Infrastructure as a Service (IaaS) is an application of cloud computing technology. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In some cases, a cloud computing model will involve the participation of a cloud provider. The cloud provider may, but need not be, a third-party service that specializes in providing (e.g., offering, renting, selling) IaaS. An entity may also opt to deploy a private cloud, becoming its own provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually, and/or using a provisioning tool) prior to deployment of code to be executed on the infrastructure. However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 1 is a block diagram illustrating an example pattern of an IaaS architecture 100, according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116, and the app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively couple to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way: the service gateway 136 can make API calls to cloud services 156, and cloud services 156 can send requested data to the service gateway 136. But, cloud services 156 may not initiate API calls to the service gateway 136.

In some examples, the secure host tenancy 104 can be directly connected to the service tenancy 119, which may be otherwise isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response to this determination, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118, both of which may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154, which may not have a desired level of threat prevention, for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119, which may be isolated from public Internet 154.

FIG. 2 is a block diagram illustrating another example pattern of an IaaS architecture 200, according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216, and the app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively couple to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique, compute instance 244 that is contained in the service tenancy 219. Each compute instance 244 may allow communication between the control plane VCN 216, contained in the service tenancy 219, and the data plane VCN 218 that is contained in the customer tenancy 221. The compute instance 244 may allow resources, that are provisioned in the control plane VCN 216 that is contained in the service tenancy 219, to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment, or other usage of resources, of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1," may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

FIG. 3 is a block diagram illustrating another example pattern of an IaaS architecture 300, according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360 and untrusted app subnet(s) 362 of the data plane app tier 346 and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 380(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 380. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 380. Respective containers 381(1)-(N) contained in the VMs 366(1)-(N) may be configured to run the code. In this case, there can be a dual isolation (e.g., the containers 381(1)-(N) running code, where the containers 381(1)-(N) may be contained in at least the VM 366(1)-(N) that are contained in the untrusted app subnet(s) 362), which may help prevent incorrect or otherwise undesirable code from damaging the network of the IaaS provider or from damaging a network of a different customer. The containers 381(1)-(N) may be communicatively coupled to the customer tenancy 380 and may be configured to transmit or receive data from the customer tenancy 380. The containers 381(1)-(N) may not be configured to transmit or receive data from any other entity in the data plane VCN 318. Upon completion of running the code, the IaaS provider may kill or otherwise dispose of the containers 381(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 381(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

FIG. 4 is a block diagram illustrating another example pattern of an IaaS architecture 400, according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N), and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively couple to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for each customer can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real-time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that requests a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, 400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

3. Computer System

Figure 5:
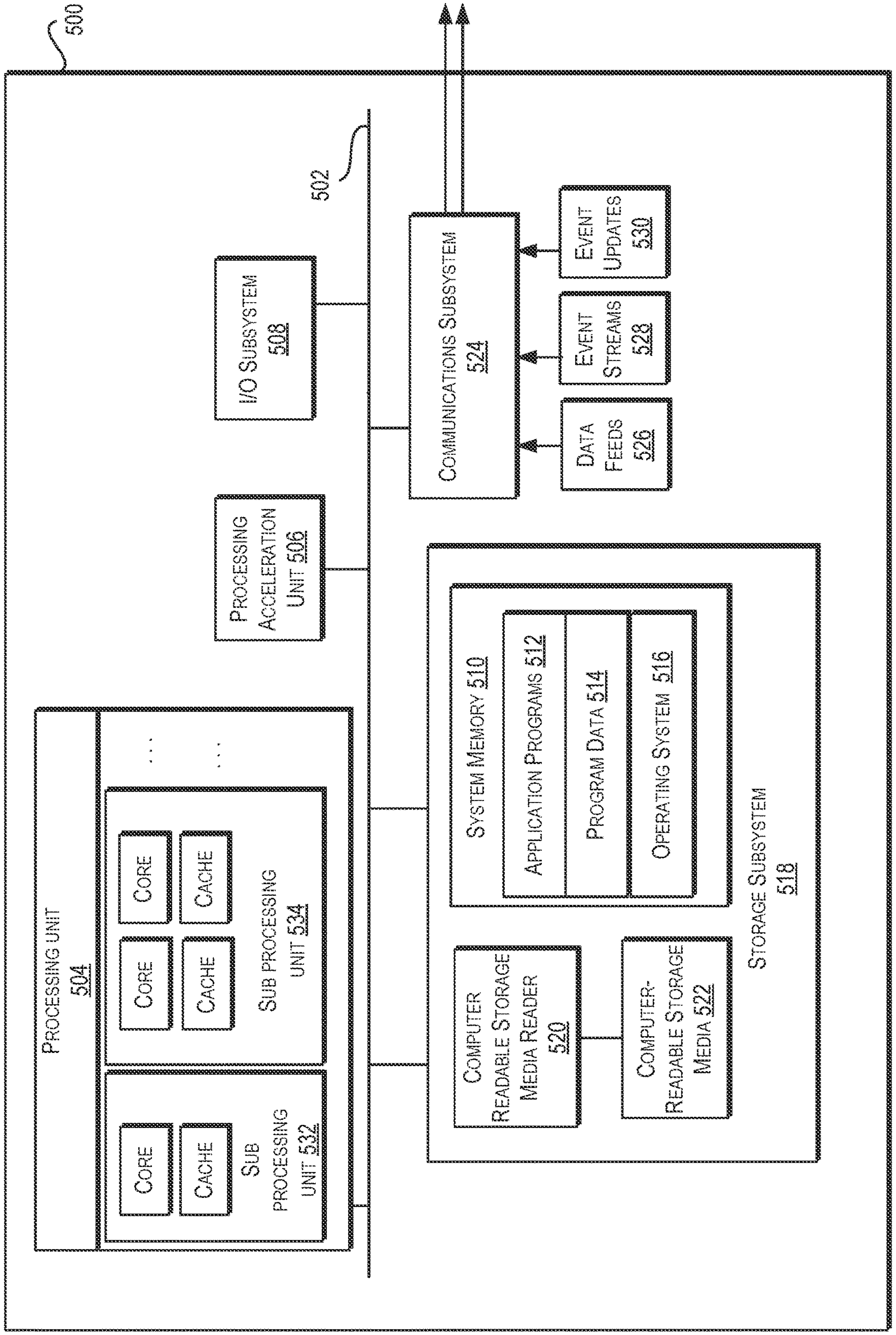
FIG. 5 is a hardware system in accordance with one or more embodiments.

FIG. 5 illustrates an example computer system 500, in which various embodiments may be implemented. The system 500 may be used to implement any of the computer systems described above. As shown in FIG. 5, computer system 500 includes a processing unit 504 that communicates with a number of peripheral subsystems via a bus subsystem 502. These peripheral subsystems may include a processing acceleration unit 506, an I/O subsystem 508, a storage subsystem 518 and a communications subsystem 524. Storage subsystem 518 includes tangible computer-readable storage media 522 and a system memory 510.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which can be implemented as one or more integrated circuits (e.g., a conventional microprocessor or microcontroller), controls the operation of computer system 500. One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, some or all of the program code to be executed can be resident in processing unit 504 and/or in storage subsystem 518. Through suitable programming, processing unit 504 can provide various functionalities described above. Computer system 500 may additionally include a processing acceleration unit 506, which can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various different kinds of programs may be loaded into system memory 510 including but not limited to client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 510 may include a basic input/output system (BIOS) containing basic routines that help to transfer information between elements within computer system 500, such as during start-up.

Computer-readable storage media 522 may represent remote, local, fixed, and/or removable storage devices plus storage media for temporarily and/or more permanently containing, storing, computer-readable information for use by computer system 500 including instructions executable by processing unit 504 of computer system 500.

Computer-readable storage media 522 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments communications subsystem 524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 524 may also be configured to receive data in the form of continuous data streams, which may include event streams 528 of real-time events and/or event updates 530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended only as a specific example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

4. Architectural Overview

Figure 6A:
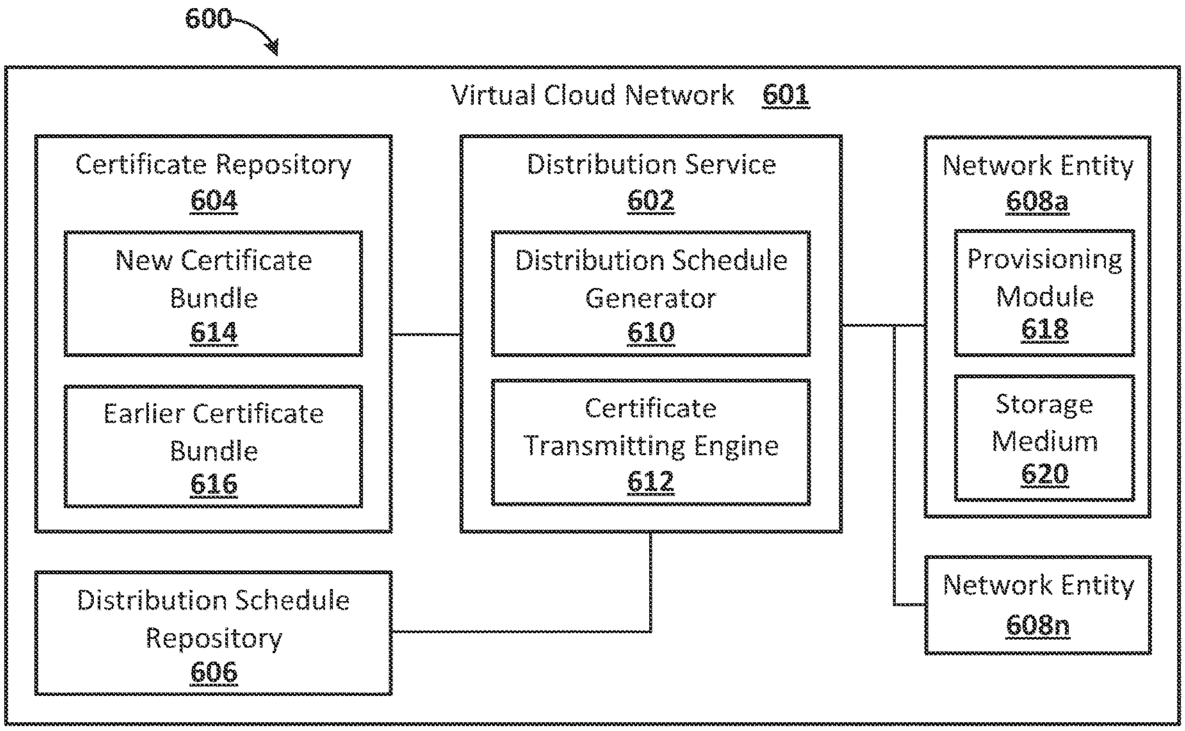
FIG. 6A illustrates features of an example virtual cloud network in accordance with one or more embodiments.
Figure 6B:
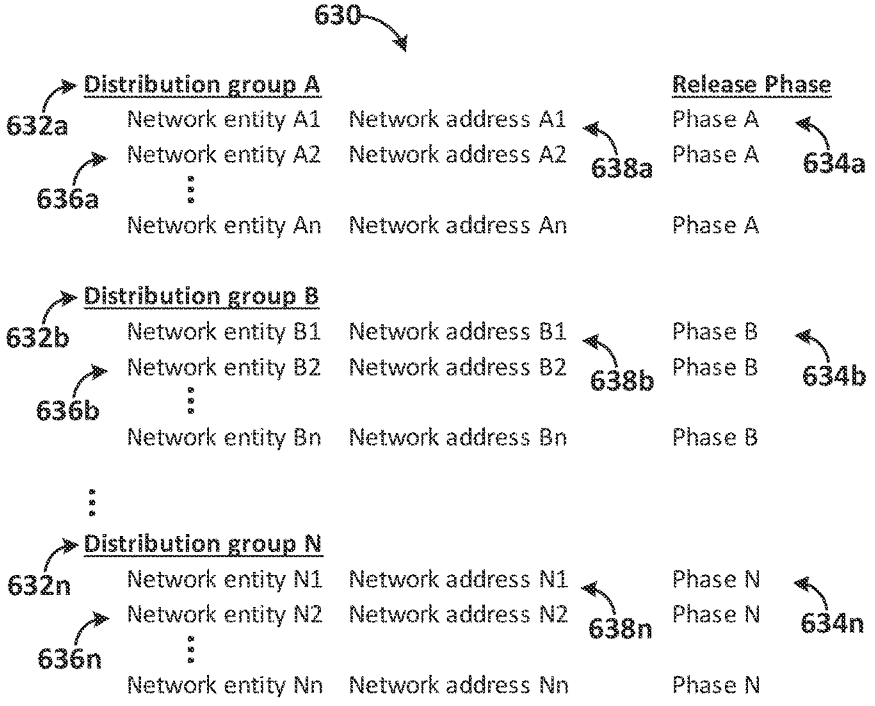
FIG. 6B illustrates an example certificate bundle distribution schedule in accordance with one or more embodiments.
Figure 6C:
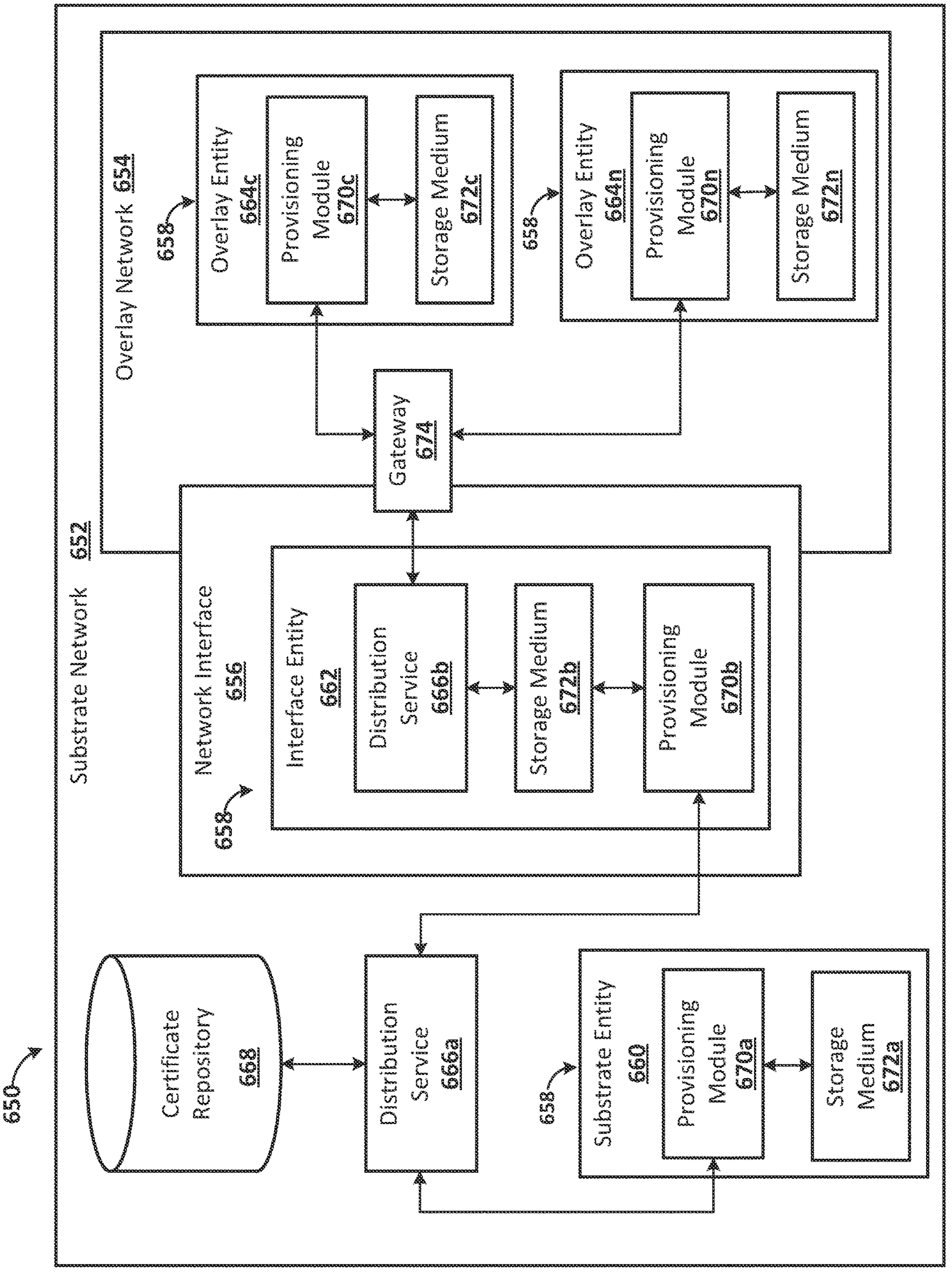
FIG. 6C illustrates further features of an example virtual cloud network in accordance with one or more embodiments.

Referring now to FIGS. 6A-6C, an example system 600 is described in accordance with one or more embodiments. The system 600 described with reference to FIGS. 6A-6C may perform operations associated with distributing certificate bundles to network entities as described herein.

As shown in FIG. 6A, the system 600 may include at least one virtual cloud network 601. A virtual cloud network 601 may include a distribution service 602, a certificate repository 604, a distribution schedule repository 606, and a plurality of network entities 608. The distribution service 602 may distribute certificate bundles to the plurality of network entities 608. The certificate bundles distributed to the network entities 608 may be stored in the certificate repository 604. The distribution of the certificate bundles may be performed in accordance with a distribution schedule. The distribution schedule may be stored in the distribution schedule repository 606.

The distribution service 602 may include a distribution schedule generator 610 and a certificate transmitting engine 612. The distribution schedule generator 610 may generate one or more distribution schedules for transmitting one or more certificate bundles to the plurality of network entities 608. The certificate transmitting engine 612 may transmit certificate bundles to the plurality of network entities, for example, in accordance with a distribution schedule. The certificate transmitting engine 612 may transmit a certificate bundle to the plurality of network entities 608 in accordance with a push regime or a pull regime. In one example, for a push regime, the certificate transmitting engine 612 may transmit a certificate bundle to a plurality of network entities 608 responsive to determining a trigger condition. The trigger condition may include a new certificate bundle becoming available in the certificate repository 604. Additionally, or in the alternative, the trigger condition may include a command in an executable file. In one example, for a pull regime, the certificate transmitting engine 612 may transmit a certificate bundle to one or more network entities 608 responsive to a request, such as from a particular network entity 608 for certificate bundle distribution. In response to the request, the certificate transmitting engine 612 may transmit the certificate bundle to one or more network entities 608 including at least the particular network entity 608 associated with the request.

In one example, the certificate transmitting engine 612 may periodically poll the certificate repository 604 for a new timestamp corresponding to a new certificate bundle having been stored in the certificate repository 604. The new timestamp may be compared to an earlier timestamp. A difference between the new timestamp and the earlier timestamp may indicate that a new certificate bundle has been added to the certificate repository 604 subsequent to the time of the earlier timestamp. A trigger condition indicating that a new certificate bundle is available in the certificate repository 604 may be based at least in part on the new timestamp differing from, such as being subsequent to, the earlier timestamp.

The certificate repository 604 may include a plurality of certificate bundles. In one example, the certificate repository 604 may include a new certificate bundle 614 and an earlier certificate bundle 616. Each certificate bundle may include one or more CA certificates. The CA certificates may include root CA certificates and/or intermediate CA certificates.

As used herein, the term "new certificate bundle" refers to a certificate bundle that, with respect to at least one network entity 608, has yet to be distributed to the at least one network entity. A new certificate bundle 614 may include a set of one or more CA certificates. The set of one or more CA certificates in a new certificate bundle may include at least one CA certificate that has yet to be included in a certificate bundle distributed to the at least one network entity 608.

As used herein, the term "earlier certificate bundle" refers to a certificate bundle that, with respect to at least one network entity 608, has previously been distributed to the at least one network entity. An earlier certificate bundle 616 may include a set of one or more CA certificates. The set of one or more CA certificates in an earlier certificate bundle 616 may include at least one CA certificate included in a certificate bundle that was previously distributed to the at least one network entity 608.

In addition, or in the alternative, to a new certificate bundle 614 and an earlier certificate bundle 616, the certificate repository 604 may include one or more certificate bundles that include a set of CA certificates for use in connection with a particular set of network entities. For example, the certificate repository 604 may include a first set of one or more certificate bundles that include a first set of CA certificates for use by a first set of network entities, and a second set of one or more certificate bundles that include a second set of CA certificates for use by a second set of network entities. In one example, the first set of one or more certificate bundles may include a first new certificate bundle 614 and a first earlier certificate bundle 616. Additionally, or in the alternative, the second set of one or more certificate bundles may include a second new certificate bundle and a second earlier certificate bundle.

The certificate repository 604 and/or the distribution schedule repository 606 may include any type of storage unit and/or device (e.g., a file system, database, collection of tables, or any other storage mechanism) for storing data. Further, the certificate repository 604 and/or the distribution schedule repository 606 may include multiple different storage units and/or devices. The multiple different storage units and/or devices may or may not be of the same type or located at the same physical site. The certificate repository 604 and the distribution schedule repository 606 may share one or more storage units. Additionally, or in the alternative, the certificate repository 604 may include one or more storage units that differ from one or more storage units of the distribution schedule repository 606. Further, the certificate repository 604 and/or the distribution schedule repository 606 may be implemented or executed on the same computing system as the distribution service 602 and/or the plurality of network entities 608. Additionally, or in the alternative, the certificate repository 604 and/or the distribution schedule repository 606 may be implemented or executed on a computing system separate from the distribution service 602 and/or the plurality of network entities 608. The certificate repository 604 and/or the distribution schedule repository 606 may be communicatively coupled to the distribution service 602 and/or the plurality of network entities 608 via a direct connection or via a network.

In one example, the distribution schedule generator 610 may partition each particular network entity 608 of the plurality of network entities 608 associated with the virtual cloud network 601 into one of a plurality of certificate distribution groups. The distribution schedule generator 610 may partition the network entities 608 into the respective certificate distribution groups based on a network address of the particular network entity 608. As a result of the partitioning, each particular certificate distribution group may include a corresponding subset of network entities 608 from the plurality of network entities.

The distribution schedule generator 610 may partition each particular network entity 608 into one of the plurality of certificate distribution groups at least by applying a randomization function to the network address of the particular network entity. The network addresses of the network entities may be determined by using an API to query a network management system associated with the virtual cloud network 601. Additionally, or in the alternative, the network addresses of the network entities may be determined using a DNS lookup function or a DNS look up table. Additionally, or in the alternative, the network addresses of the network entities may be determined by referencing a host configuration log. For example, network entities may be automatically assigned an IP address when they are provisioned or booted-up. The IP addresses may be assigned according to a dynamic host configuration protocol. Additionally, or in the alternative, the network addresses of the network entities may be determined by querying metadata associated with the network addresses.

A product of the randomization function may be used to determine a particular certificate distribution group of the plurality of certificate distribution groups for the particular network entity 608. In one example, the randomization function may include a hash function and a modulo function. The hash function may generate a hash value of the network address for a particular network entity 608. The modulo function may be executed on the hash value of the network address. The modulo function may output a remainder, and the certificate distribution group may be selected based at least in part on the remainder corresponding to the particular network entity 608. As used herein, the term "modulo function" refers to a mathematical operation that computes a remainder after division of a dividend by a divisor. A modulo function may be represented as "A mod B," where "A" is the dividend and "B" is the divisor. The product of the modulo function is the remainder obtained when "A" is divided by "B." The remainder represents what is left over after the division of the dividend by the divisor. As an example, for 15 mod 7=1, where dividing 15 by 7 gives a quotient of 2 and a remainder of 1. As another example, 27 mod 5=2, where dividing 27 by 5 gives a quotient of 5 and a remainder of 2. In one example, the remainder may be rounded to the nearest whole number.

In one example, a quantity of certificate distribution groups in the plurality of certificate distribution groups may correspond to a modulus base of the modulo function. As used herein, the term "modulus base" refers to the divisor "B" in the modulo function. The modulus base represents the number by which the dividend, "A," is divided. In one example, each particular certificate distribution group of the plurality of certificate distribution group may correspond to a particular remainder from among the modulus base. Additionally, or in the alternative, each particular certificate distribution group may include a particular subset of network entities corresponding to one or more remainder values from among the modulus base. In one example, each particular certificate distribution group may correspond to a particular remainder value. For example, a first certificate distribution group may include network entities corresponding to a remainder value of 1, a second certificate distribution group may include network entities corresponding to a remainder value of 2, and an Nth certificate distribution group may include network entities corresponding to a remainder value of N, where N is the modulus base. Additionally, or in the alternative, each certificate distribution group may correspond to a plurality of remainder values obtainable from the modulo function. For example, a first certificate distribution group may include network entities corresponding to a remainder value within the range of 1 to N/x, a second certificate distribution group may include network entities corresponding to a remainder value within the range of 1+N/x to 2(N/x), and an Nth certificate distribution group may include network entities corresponding to a remainder value of x−1 to N, where "N" is the modulus base and "x" is the number of certificate distribution groups.

In one example, a randomization function may provide a random distribution of network entities across the plurality of certificate distribution groups. For example, the hash function may generate a unique, or random hash value from the network address corresponding to a network entity. Additionally, or in the alternative, executing of the modulo function on the hash values corresponding to a plurality of network entities may result in an even distribution of remainder values resulting from the modulo function. The allocation of the network entities to a certificate distribution group corresponding to the remainder resulting from the modulo function may result in an even distribution of network entities across the certificate distribution groups.

In one example, the modulus base may be selected based on a desired quantity of network entities in a certificate distribution group. Additionally, or in the alternative, the modulus base may be selected based on a desired percentage of the total quantity of network entities, in the set of network entities, in a certificate distribution group. In one example, the quantity of network entities in a certificate distribution group may differ as between respective certificate distribution groups. In one example, the modulus base may be selected based at least in part on an acceptable level of variance in the quantity of network entities in a certificate distribution group. In one example, the modulus base may be 100. In one example, the modulus base may be 1,000.

In one example, a quantity of remainders corresponding to particular certificate distribution groups may be equivalent as between at least some of the certificate distribution groups. For example, the plurality of certificate distribution groups may be spread evenly across the modulus base such that each certificate distribution group includes an equivalent quantity of remainders. Alternatively, a quantity of remainders corresponding to a particular certificate distribution group may differ as between at least some of certificate distribution groups. For example, the plurality of certificate distribution groups may be spread disproportionately across the modulus base such that at least some of the certificate distribution group includes a different quantity of remainders relative to one or more of the other certificate distribution groups. In one example, a first certificate distribution group may include a first subset of network entities that correspond to a first set of one or more remainder values from among the modulus base, and wherein a second certificate distribution group may include a second subset of network entities that correspond to a second set of one or more remainder values from among the modulus base. A first quantity of remainders in the first set of one or more remainder values may differ from, and/or may be less than, a second quantity of remainder values in the second set of one or more remainder values. In one example, a distribution schedule may include a series of certificate distribution groups that respectively include an increasing quantity of remainder values from among the modulus base. As a result of the increasing quantity of remainder values from among the modulus base, the particular certificate distribution groups of the series of certificate distribution groups may include an increasing quantity of network entities. In one example, the quantity of remainder values and/or the quantity of network entities in the respective certificate distribution groups of the series of certificate distribution groups may correspond to an exponential function and/or a recursive function. An exponential function may include at least one of: a base exponential function (e.g., f(x)=a^x, where "as" is a constant base greater than zero and not equal to 1), a natural exponential function (e.g., f(x)=e^x, where "e" is the base of the natural logarithm), a logistic function, a Gompertz function, a Weibull function. A recursive function may include a function that can be defined in terms of itself. A recursive function may include at least one of: a Fibonacci sequence, a factorial function, an Ackermann function, or a Collatz conjecture. In one example, a recursive function may include an exponential function, such as f(x)=a*f(x−1), where "a" is a constant base multiplied by the previous term, f(x−1).

The hash function utilized in the randomization function may include a cryptographic hash function or a non-cryptographic hash function. The hash function utilized in the randomization function may be selected based on one or more of the following properties: determinism, irreversibility, or avalanche effect. Determinism refers to the same input producing the same hash value. Irreversibility refers to difficulty in deriving an original input from the hash value. Avalanche effect refers to small changes in an input resulting in significant changes in the hash value. An example hash function may include a cryptographic hash function, such as an SHA-256 hash function, an Argon2 hash function, a Message Digest Algorithm 5 hash function, a RIPEMED hash function, a Whirlpool hash function, a Tiger hash function, a SipHash function, a BLAKE2 hash function, or an SHA3 (e.g., SHA3-256) hash function. By way of illustration, an SHA-256 or an SHA3-256 hash function may transform an input into a 256-bit output. Additionally, or in the alternative, an example hash function may include a non-cryptographic hash function, such as a MurmurHash hash function, a CityHash hash function, a Jenkins hash function, an xxHash hash function, a Fowler-Noll-Vo hash function, or a CRC32 hash function.

In one example, the certificate transmitting engine 612 may select a certificate distribution group, from among the plurality of certificate distribution groups, for distribution of a certificate bundle. The certificate distribution group may be selected based on a distribution schedule from the distribution schedule repository 606. In one example, the certificate transmitting engine 612 may transmit a certificate bundle to the certificate distribution groups in a series of release phases. The certificate distribution group selected by the certificate transmitting engine 612 may correspond to a current release phase, for example, of a series of release phases for distributing the certificate bundle to the plurality of network entities 608. For example, with respect to a first release phase, the certificate transmitting engine 612 may select a first certificate distribution group and transmit the certificate bundle to a first subset of network entities in the first certificate distribution group. Additionally, or in the alternative, with respect to a second release phase, the certificate transmitting engine 612 may select a second certificate distribution group and transmit the certificate bundle to a second subset of network entities in the second certificate distribution group.

In one example, the distribution service 602 may detect a trigger condition to distribute a certificate bundle. The trigger condition may include a command, such as in an executable file associated with a certificate distribution process, to distribute a certificate bundle to one or more the network entities 608. Additionally, or in the alternative, the trigger condition may include the distribution service having determined a presence of a new certificate bundle 614 in the certificate repository 604. Additionally, or in the alternative, the trigger condition may include a request from a network entity 608 for the distribution service 602 to distribute a certificate bundle to the network entity 608. In one example, the distribution schedule generator 610 may generate a distribution schedule in response to the distribution service 602 detecting the trigger condition. Additionally, or in the alternative, the distribution schedule generator 610 may generate a distribution schedule prior to the distribution service 602 detecting the trigger condition. In one example, the certificate transmitting engine 612 may transmit a certificate bundle to one or more network entities in response to the distribution service 602 detecting the trigger condition.

As shown in FIG. 6A, a network entity 608 may include a provisioning module 618 and a storage medium 620. The provisioning module 618 may perform an initial provisioning of the network entity 608. Additionally, or in the alternative, the provisioning module 618 may perform periodic updates to the network entity 608. An initial provisioning and/or a periodic update of a network entity 608 may include obtaining a certificate bundle and installing the certificate bundle in the storage medium 620 associated with the network entity 608. The provisioning module 618 may request a certificate bundle from the distribution service 602. The request for a certificate bundle may be associated with an initial provisioning of the network entity 608 or a periodic update to the network entity 608. The distribution service 602 may distribute a certificate bundle to the provisioning module 618 responsive to a request from the provisioning module 618. Additionally, or in the alternative, the distribution service may push certificate bundles to a provisioning module 618, for example, without receiving a request from the provisioning module 618.

The storage medium 620 may include any type of storage unit and/or device (e.g., a file system, database, collection of tables, or any other storage mechanism) for storing data. Further, the storage medium 620 may include multiple different storage units and/or devices. The multiple different storage units and/or devices may or may not be of the same type or located at the same physical site. The storage medium 620 may include one or more storage units. Further, the storage medium 620 may be implemented or executed on the same computing system as the provisioning module 618. Additionally, or in the alternative, the storage medium 620 may be implemented or executed on a computing system separate from the provisioning module 618. The storage medium 620 may be communicatively coupled to the provisioning module 618 via a direct connection or via a network.

Referring now to FIG. 6B, an example distribution schedule 630 is described. As shown in FIG. 6B, a distribution schedule 630 may include a plurality of distribution groups 632. Each of the plurality of distribution groups may correspond to one or a plurality of release phases 634. Each distribution group 632 may include a subset of network entities 636 and a corresponding network address 638. The distribution schedule 630 may be stored in the distribution schedule repository 606 described with reference to FIG. 6A.

Referring now to FIG. 6C, the system 600 is further described with reference to an example virtual cloud network 650. The virtual cloud network 650 may include the virtual cloud network 601 described with reference to FIG. 6A. As shown in FIG. 6C, the virtual cloud network 650 may include a substrate network 652, an overlay network 654, and a network interface 656 that provides communication between the substrate network 652 and the overlay network 654. The system may include a plurality of network entities 658 located throughout the virtual cloud network. The plurality of network entities 658 may correspond to the plurality of network entities 608 described with reference to FIG. 6A. A network entity 658 may reside on the substrate network 652, the overlay network 654, or the network interface 656. A network entity 658 may be implemented in hardware and/or software in association with the virtual cloud network, such as a node, a host, an agent, a service, a component, an endpoint, or other element. The plurality of network entities 658 may include one or more substrate entities 660, one or more interface entities 662, and/or one or more overlay entities 664.

As used herein, the term “substrate entity” refers to a network entity 658 implemented in a substrate network 652. As used herein, the term “substrate network” refers to a physical network infrastructure. The substrate network generally provides a foundation of a virtual cloud network. The substrate network 652 may include physical network devices, such as routers, switches, network links, and other networking components. The substrate network 652 may generally provide the basic connectivity and transport capabilities necessary for data transmission within and between data centers.

The one or more substrate entities 660 may include substrate hosts, routers, firewall appliances, load balancers, storage devices, and/or substrate services. A substrate host may include an endpoint within the substrate network 652, such as a bare metal host, a virtual machine, a container, or a physical server. A substrate service may include a service executing or executable on a substrate entity, such as a firmware service, a network connectivity service, an addressing service, a name resolution service, a security service, a network monitoring service, a load balancing service, and/or a storage service. A firmware service may be associated with functionality or management of network infrastructure components or services, such as network devices, boot-up or initialization process, hardware controls, feature enablement, updates, hardware abstraction, network configuration, and/or network management. In one example, a substrate entity 660 may include a combination of hardware and software. In one example, the one or more substrate entities 660 may include one or more substrate hosts, and/or one or more substrate services. In one example, a substrate host may include a bare metal host. In one example, a substrate service may include a firmware service. The substrate entities 660 may communicate with one another, and/or with other network entities 658, using logical network addresses assigned within the overlay network.

As used herein, the term “network interface” refers to a communication interface between a substrate network and an overlay network, such as a network interface card, a smartNIC, or the like. A network interface 656 may include one or more interface entities 662, such as a node on the network interface 656, or an interface service executing or executable on the network interface 656. A node on the network interface 656 may include a programmable hardware component, a memory component, or a gateway component. In one example, a network interface 656 may include a network interface card, such as a smartNIC.

Additionally, or in the alternative, a network interface 656 may include a node or an endpoint on a network interface card or smartNIC.

A gateway component may provide connectivity between the substrate network 652 and the network interface 656, and/or between the network interface 656 and the overlay network 654. For example, a gateway component may enable communication between overlay entities 664 and substrate entities 660. Additionally, or in the alternative, a gateway component may provide connectivity between the overlay network 654 and external networks, such as the internet or other networks outside the overlay network. For example, an overlay gateway may enable communication between overlay entities 664 and external endpoints.

As used herein, the term "overlay network" refers to a virtual network built on a substrate network using software-defined networking (SDN), virtualization, tunneling, and/or encapsulation technologies. An overlay network generally operates independently of the underlying substrate network. An overlay network may provide logical separation and isolation of traffic, enable virtual network provisioning, and/or allow for implementation of various network services and policies. Virtual machines, hosts, containers, or virtual network functions running on a substrate network may be connected via an overlay network.

As used herein, the term "overlay entity" refers to a network entity 658 implemented on an overlay network 654. The overlay network 654 may include a plurality of overlay entities 664. The plurality of overlay entities 664 may include overlay hosts, overlay services, subnets, overlay controllers, and/or overlay clients. In one example, the overlay network 654 may include a plurality of overlay entities 664, such as overlay entity 664*c* and overlay entity 664*n*. In one example, an overlay entity 664 may include an overlay host. Additionally, or in the alternative, an overlay entity 664 may include an overlay service. The plurality of overlay entities 664 may communicate with one another using logical network addresses assigned within the overlay network 654.

An overlay host may include an endpoint within the overlay network 654, such as a virtual machine, a container, or a physical server. An overlay service may include a service executing or executable on an overlay entity. An overlay service may include a client-specific service, such as a service installed by a client. Additionally, or in the alternative, an overlay service may include a virtual network creation service, a virtual network management service, a virtual machine orchestration service, a container orchestration service, a network virtualization service, an overlay security service, a load balancing service, a multi-tenancy service, and/or a tenant isolation service.

A subnet may include a virtual network segment that has a distinct addressing scheme and/or a distinct set of network policies and/or services. A subnet may include a set of overlay hosts. Multiple subnets may be utilized to partition respective sets of overlay hosts. An overlay: controller may oversee management, control, provisioning, configuration, and/or monitoring of an overlay network, network entities on the overlay network, and/or network policies within the overlay. An overlay controller interact with the underlying substrate network, for example, to coordinate the operation of overlay hosts and/or communications across virtual switches and tunnels. An overlay client may include an endpoint or device that initiates communication within the overlay network. An overlay client may be a specific instance or role within an overlay host. An overlay host may include a set of overlay clients. An overlay client may include a consumer or user of services provided by overlay hosts or the IaaS. An overlay client may request and consume resources or services from overlay hosts, acting as consumers or clients of those resources or services.

Referring further to FIG. 6C, the system 600 may include at least one distribution service 666 and at least one certificate repository 668. The at least one distribution service 666 may correspond to the distribution service 602 described with reference to FIG. 6A. A distribution service 666 may be configured to distribute certificate bundles that include CA certificates to at least some of the network entities 658. The certificate bundles may be housed in a certificate repository 668 accessible by the distribution service 666. The certificate repository 668 may correspond to the certificate repository 604 described with reference to FIG. 6A. The distribution service 666 may retrieve a certificate bundle from the certificate repository 668 and transmit the certificate bundle to one or more of the network entities 658. In one example, a distribution service 666 may be configured to transition, such as concurrently transition, a plurality of network entities through a series of stages of a certificate bundle distribution process for distributing a new set of one or more CA certificates to the plurality of network entities 658 for use in a certificate authentication process.

In one example, a first distribution service 666*a* may be implemented on the substrate network 652. A distribution service 666 implemented on the substrate network 652 may be communicatively coupled with one or more substrate entities 660 on the substrate network 652. Additionally, or in the alternative, a distribution service 666 implemented on the substrate network 652 may be communicatively coupled with the network interface 656, such as with one or more interface entities 662 on the network interface 656. For example, the first distribution service 666*a* may obtain certificate bundles from the certificate repository 668 and distribute the certificate bundles to one or more substrate entities 660 on the substrate network 652 and/or to one or more interface entities 662 on the network interface 656.

In one example, a second distribution service 666*b* may be implemented on the network interface 656. A distribution service 666 implemented on the network interface 656 may be communicatively coupled with the overlay network 654 and/or the substrate network 652. For example, the second distribution service 666*b* implemented on the network interface 656 may be communicatively coupled with one or more overlay entities 664 on the overlay network 654. The second distribution service 666*b* may distribute certificate bundles to one or more overlay entities 664 on the overlay network 654. In one example, the second distribution service 666*b* may obtain certificate bundles from a storage medium associated with the network interface 656, such as from a storage medium associated with an interface entity 612 on the network interface 656. For example, the second distribution service 666*b* may distribute a certificate bundle that has been installed in the storage medium associated with the network interface 656 and/or the interface entity 662. In one example, the first distribution service 666*a* may distribute a certificate bundle to an interface entity 662 on the network interface 656, and the second distribution service 666*b* may distribute the certificate bundle to one or more overlay entities 664 on the overlay network 654 after the certificate bundle has been installed in the storage medium associated with the interface entity 662.

As shown in FIG. 6C, each network entity 658 may include a provisioning module 670 and a storage medium 672. The provisioning module 670 may correspond to provisioning module 618 described with reference to FIG. 6A.

The storage medium 672 may correspond to the storage medium 620 described with reference to FIG. 6A. The provisioning module 670 associated with a network entity 658 may receive certificate bundles from the distribution service 666 and install the certificate bundle in the storage medium 672 associated with the network entity 658. The distribution service 666 may distribute a certificate bundle to the provisioning module 670 in connection with an initial provisioning of the network entity 658 and/or in connection with a periodic update. Additionally, or in the alternative, the distribution service 666 may distribute a certificate bundle to the provisioning module 670 in accordance with a respective stage of a certificate bundle distribution process.

In one example, a provisioning module 670 of an overlay entity 664 may send requests for a certificate bundle to a distribution service 666 by way of a gateway 674 between the network interface 656 and the overlay entities 664. Additionally, or in the alternative, the distribution service 666 may send the certificate bundles to the overlay entities 664 by way of the gateway 674, for example, in response to a request from a provisioning module 670. In one example, the gateway 674 may be a metadata interface configured for exchanging metadata between the network interface 656 and the overlay entities 664 In one example, the gateway 674 may be utilized between the network interface 656 and each of the overlay entities 664. Additionally, or in the alternative, the network interface 656 may include a set of gateways 674, with each gateway 674 corresponding to a respective overlay entity 664.

In one or more embodiments, the system 600 may include more or fewer components than the components illustrated in FIGS. 6A-6C. The components illustrated in FIGS. 6A-6C may be local to or remote from each other. The components illustrated in FIGS. 6A-6C may include software and/or hardware components. Each component may be distributed over multiple applications and/or machines. Multiple components may be combined into one application and/or machine. Operations described with respect to one component may instead be performed by another component. Additional embodiments and/or examples relating to the system 600 are described above in Section 2, titled "Cloud Computing Technology".

In an embodiment, the system 600 may include various components implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

5. Example Certificate Bundle Distribution Process

Referring now to FIG. 7, operations pertaining to an example certificate bundle distribution process are further described. The operations 700 described with reference to FIG. 7 may be associated with distributing a new set of one or more CA certificates to a plurality of network entities for use in a certificate authentication process. The CA certificates may include root CA certificates and/or intermediate CA certificates. The CA certificates may be housed in a certificate bundle. One or more operations 700 illustrated in FIG. 7 may be modified, rearranged, or omitted all together. Accordingly, the particular sequence of operations 700 illustrated in FIG. 7 should not be construed as limiting the scope of one or more embodiments. As shown in FIG. 7, operations 700 pertaining to the certificate bundle distribution process may include a series or sequence of stages. In one example, as shown, the operations 700 may include a series or sequence of stages, such as four (4) stages. In another example, the series or sequence of stages may include more or less than four (4) stages, for example, including all or a portion of the stages shown in FIG. 7.

In one example, the operations 700 may include, at block 702, distributing a new certificate bundle including a new set of one or more CA certificates to a set of network entities associated with a virtual cloud network. The new set of one or more CA certificates may include at least one new CA certificate. Additionally, or in the alternative, a set of new CA certificates may be added to existing certificate bundles.

At block 704, the operations 700 may include determining whether the new certificate bundle has been successfully distributed. When the new certificate bundle has been successfully distributed, the operations 700 may proceed to a next stage in the distribution process. The operation at block 702 and/or 704 may represent Stage 1 of a certificate bundle distribution process.

In one example, the operations 700 may include, at block 706, activating the CA certificates in the new certificate bundle. In one example, activating the CA certificate may include a CA corresponding to the CA certificate issuing one or more intermediate CA certificates. The operation at block 706 may represent Stage 2 of a certificate bundle distribution process.

In one example, the operations 700 may include, at block 708, distributing new entity certificates to the set of network entities. Additionally, or in the alternative, the operations 700 may include distributing new intermediate CA certificates, for example, corresponding to the new entity certificates.

At block 710, the operations 700 may include determining whether the new entity certificates have been successfully distributed. Additionally, or in the alternative, the operations may include determining whether the new intermediate CA certificates have been successfully distributed. When the new entity certificates (and/or the new intermediate CA certificates) have been successfully distributed, the operations 700 may proceed to a next stage in the distribution process. The operation at block 708 and 710 may represent Stage 3 of a certificate bundle distribution process.

In one example, the operations 700 may include, at block 712, removing earlier CA certificates that were distributed prior to the new CA certificates. For example, the earlier CA certificates may include CA certificates that are being superseded by the new CA certificates. Removing an earlier CA certificate with respect to a particular network entity may include deleting the earlier CA certificate from a storage medium associated with the particular network entity. For example, the operations 700 may include transmitting, to the particular network entity, an instruction to delete the earlier CA certificate from the storage medium. Rpensive to receiving the instruction, the particular network entity may delete the earlier CA certificate from the storage medium.

Additionally, or in the alternative, removing an earlier CA certificate with respect to a network entity may include replacing a first new certificate bundle with a second new certificate bundle, in which the first new certificate bundle includes the new CA certificates and the earlier CA certificates and the second new certificate bundle includes only the new CA certificates, thereby effectively removing the earlier CA certificates from the first new certificate bundle. The second new certificate bundle may be distributed to the particular network entity and installed in the storage medium associated with the particular network entity, and the first new certificate bundle may be deleted from the storage medium. The operation at block 712 may represent Stage 4 of a certificate bundle distribution process.

6. Example Certificate Bundle Distribution Operations

Figure 8A:
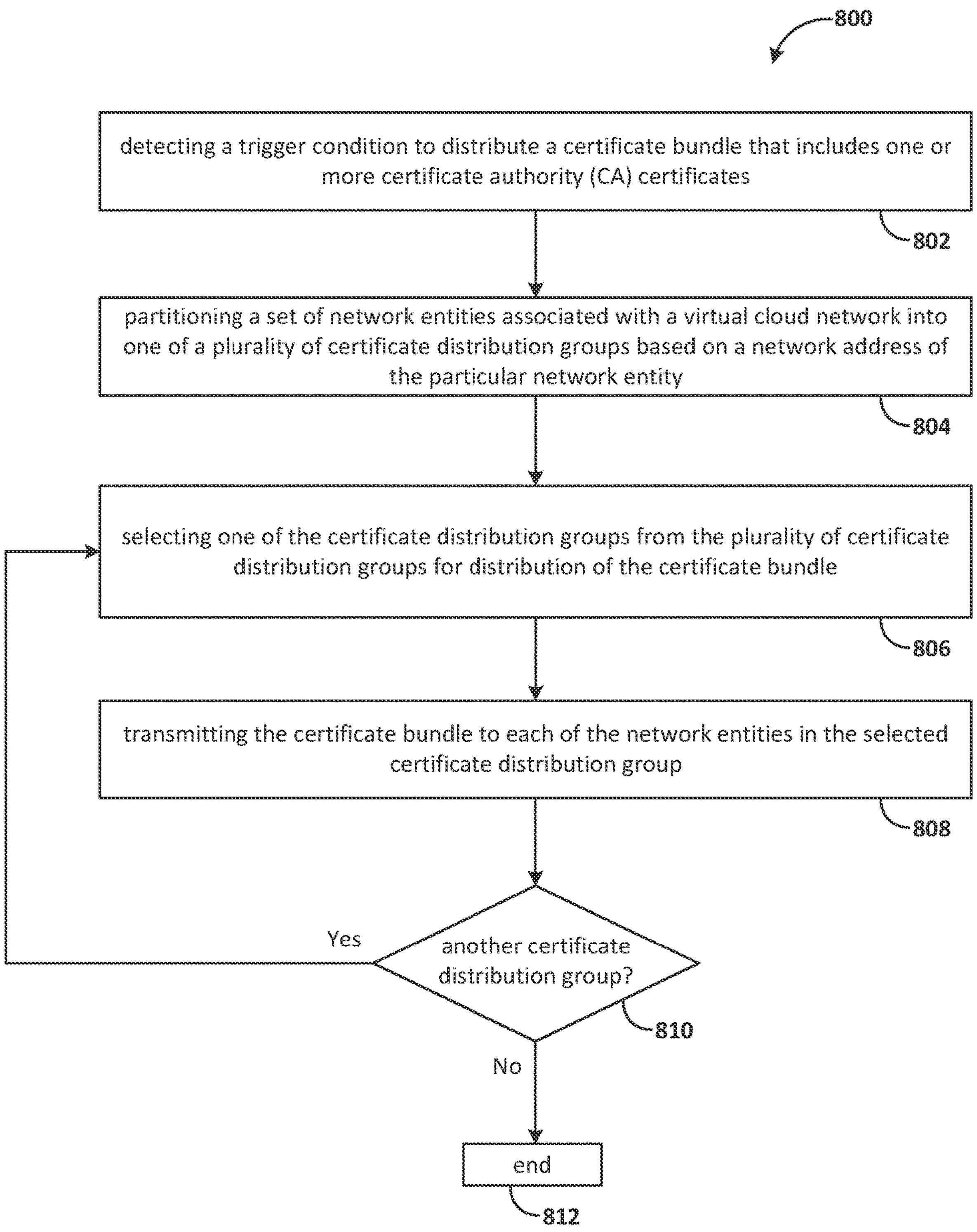
FIGS. 8A and 8B are flowcharts that illustrates example operations pertaining to distributing certificate bundles to network entities in accordance with one or more embodiments.
Figure 8B:
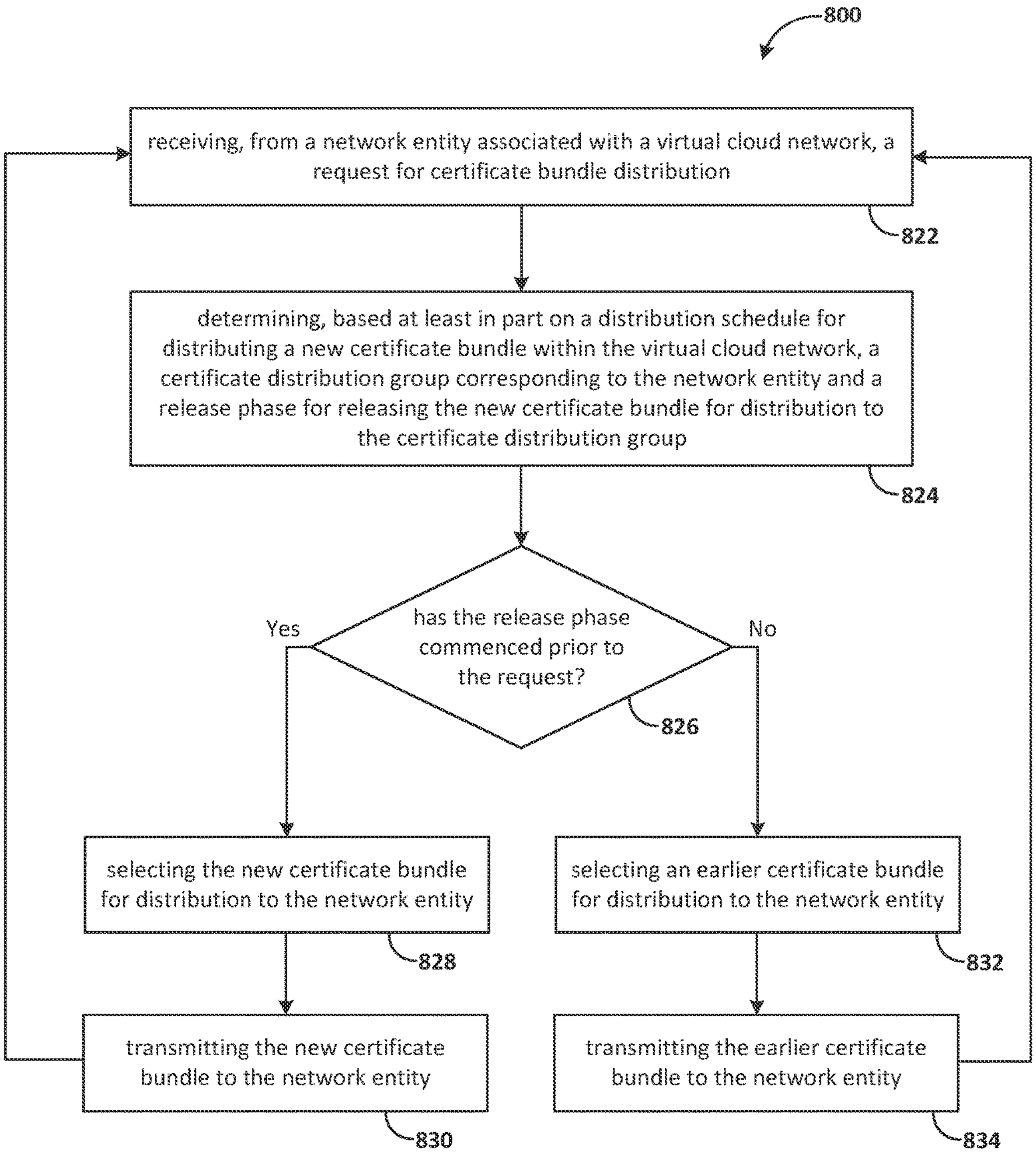

Referring now to FIGS. 8A and 8B, operations 800 pertaining to distributing certificate bundles are further described. The operations 800 described with reference to FIGS. 8A and 8B may represent at least a portion of a process for distributing certificate bundles to network entities, for example, as described herein with reference to FIG. 7. One or more operations 800 described with reference to in FIGS. 8A and 8B may be modified, combined, rearranged, or omitted all together. Accordingly, the particular sequence of operations 800 described with reference to FIGS. 8A and 8B should not be construed as limiting the scope of one or more embodiments.

A. Distributing Certificate Bundles According to Certificate Distribution Groups.

Referring to FIG. 8A, operations associated with distributing certificate bundles according to certificate distribution groups are further described. As shown in FIG. 8A, the operations 800 may include, at block 802, detecting a trigger condition to distribute a certificate bundle that includes one or more CA certificates.

At block 804, the operations 800 may include partitioning a set of network entities associated with a virtual cloud network into one of a plurality of certificate distribution groups based on a network address of the particular network entity. Each particular network entity of the set of network entities may be partitioned into one of the certificate distribution groups based on the network address of the particular network entity. Each particular certificate distribution group may include a subset of network entities from the set of network entities.

At block 806, the operations 800 may include selecting one of the certificate distribution groups from the plurality of certificate distribution groups for distribution of the certificate bundle. At block 808, the operations 800 may include transmitting the certificate bundle to each of the network entities in the selected certificate distribution group.

At block 810, the operations 800 may include determining whether there is another certificate distribution group, from the plurality of certificate distribution group, that includes a subset of network entities that have yet to receive the certificate bundle. If there is another certificate distribution group, the operations may proceed to block 806, where another certificate distribution group may be selected. When the certificate bundle has been transmitted to each subset of network entities, such that, at block 810, is not another certificate distribution groups, the operations may end at block 812.

B. Requests from Network Entities for Certificate Bundle Distribution.

Referring to FIG. 8B, operations associated with distributing certificate bundles in response to requests from network entities are further described. As shown in FIG. 8B, the operations 800 may include, at block 822 receiving, from a network entity associated with a virtual cloud network, a request for certificate bundle distribution.

At block 824, the operations 800 may include determining, based at least in part on a distribution schedule for distributing a new certificate bundle within the virtual cloud network, a certificate distribution group corresponding to the network entity and a release phase for releasing the new certificate bundle for distribution to the certificate distribution group. The distribution schedule may include a set of certificate distribution groups and a set of release phases. Each particular release phase of the set of release phases may correspond to at least one certificate distribution group of the set of certificate distribution groups. Each particular certificate distribution group of the set of certificate distribution groups may correspond to a particular set of network addresses of the virtual cloud network.

At block 826, the operations 800 may include determining whether the release phase corresponding to the certificate distribution group has commenced prior to the request from the network entity. If the release phase has commenced prior to the request from the network entity, the operations 800 may proceed to block 828. If the release phase has not commenced prior to the request from the network entity, the operations 800 may proceed to block 832.

At block 828, when the release phase has commenced prior to the request from the network entity, the operations 800 may include selecting the new certificate bundle for distribution to the network entity. The new certificate bundle may be selected for distribution to the network entity based at least in part on the release phase having commenced prior to the request from the network entity. At block 830, the operations 800 may include transmitting the new certificate bundle to the network entity. The new certificate bundle may include one or more CA certificates. The one or more CA certificates may include at least one new CA certificate. Following the operations 800 at block 830, operations 800 may return to block 822, where another request for certificate bundle distribution may be received from another network entity.

At block 832, when the release phase has not commenced prior to the request from the network entity, the operations 800 may include selecting an earlier certificate bundle for distribution to the network entity. The earlier certificate bundle may be selected for distribution to the network entity based at least in part on the release phase having yet to commence prior to the request from the network entity. At block 830, the operations 800 may include transmitting the earlier certificate bundle to the network entity. The earlier certificate bundle may include one or more CA certificates. The one or more CA certificates may include at least one earlier CA certificate. Following the operations 800 at block 834, operations 800 may return to block 822, where another request for certificate bundle distribution may be received from another network entity.

In one example, the operations 800 described with reference to FIGS. 8A and 8B may be combined. For example, partitioning the set of network entities into one of the plurality of certificate distribution groups based on the network address of the particular network entity, at block 804 of FIG. 8A, may include receiving a request for certificate bundle distribution from a network entity at block 822 of FIG. 8B. Additionally, or in the alternative, partitioning the set of network entities into one of the plurality of certificate distribution groups based on the network address of the particular network entity, at block 804 of FIG. 8A, may include determining, based at least in part on the distribution schedule for distributing the certificate bundle, a certificate distribution group corresponding to the network entity and a release phase for releasing the certificate bundle for distribution to the certificate distribution group, at block 824 of FIG. 8B.

C. Distribution Criteria for Transmitting Certificate Bundles.

In one example, the operations 800 may include progressing through a series of distribution groups in a distribution schedule based at least in part on one or more distribution criteria being satisfied for a current certificate distribution group. For example, the operations 800 may include transmitting the certificate bundle to each of the network entities in the selected certificate distribution group, for example, at block 808 of FIG. 8A, determining that one or more distribution criteria are satisfied with respect to the selected certificate distribution group, and responsive to determining that the one or more distribution criteria are satisfied, transmitting the certificate bundle to the network entities in a next certificate distribution group.

Additionally, or in the alternative, the operations 800 may include progressing to through a series of release phases in a distribution schedule based at least in part on one or more distribution criteria being satisfied for a release phase. For example, with reference to FIG. 8B, the operations 800 may include commencing a release phase for releasing a certificate bundle for distribution to a certificate distribution group, determining that one or more distribution criteria are satisfied, and commencing a next release phase in the distribution schedule responsive to determining that one or more distribution criteria are satisfied.

In one example, with reference to FIG. 8A and/or FIG. 8B, the operations 800 may include determining a distribution metric with respect to distribution of a certificate bundle to a first subset of network entities corresponding to a first certificate distribution group, and determining whether the distribution metric meets one or more distribution criteria. Responsive to the distribution metric meeting the one or more distribution criteria, the operations 800 may include transmitting the certificate bundle to a second subset of network entities corresponding to a second certificate distribution group. In one example, with reference to FIG. 8A, the operations 800 may include, prior to proceeding from block 810 to block 806, determining whether the distribution metric meets one or more distribution criteria. If the distribution metric meets the one or more distribution criteria, the operations 800 may proceed to block 806.

In one example, the distribution metric may include an error count associated with transmitting a certificate bundle to a subset of network entities corresponding to a certificate distribution group. The error count may be indicative of a number or a proportion of network entities from among the subset of network entities with respect to which an error event associated with the certificate bundle occurs during a verification period. The one or more distribution criteria may include the error count remaining below a threshold during the verification period.

In one example, the distribution metric may include a distribution count associated with transmitting a certificate bundle to a subset of network entities corresponding to a certificate distribution group. The distribution count may be indicative of a number or a proportion of network entities from among the subset of network entities with respect to which a distribution indicator indicates a successful distribution of the certificate bundle. The one or more distribution criteria may include the distribution count meeting a threshold.

D. Partitioning Criteria.

Referring further to FIGS. 8A and 8B, in one example, the plurality of network entities may be partitioned into one of a plurality of certificate distribution groups based on one or more partitioning criteria. As described with reference to block 804 of FIG. 8A, the one or more partitioning criteria may include a network address of the particular network entity.

In one example, one or more of the certificate distribution groups may be further partitioned into one or more certificate distribution subgroups based at least in part on one or more successful distribution variables and/or one or more unsuccessful distribution variables. In one example, each particular network entity corresponding to a particular certificate distribution subgroup may be associated with a particular successful distribution variable and/or a particular unsuccessful distribution variable corresponding to the particular certificate distribution subgroup. The one or more successful distribution variables may include one or more characteristics associated with a likelihood of having a successful distribution. The one or more unsuccessful distribution variables may include one or more characteristics associated with a likelihood of an unsuccessful distribution. In one example, the operations 800 may include progressing through a series of certificate distribution subgroups of a certificate distribution group based at least in part on one or more distribution criteria being satisfied for a current distribution subgroup. For example, the operations 800 may include transmitting the certificate bundle to each of the network entities in a selected certificate distribution subgroup, determining that one or more distribution criteria are satisfied with respect to the selected certificate distribution subgroup, and responsive to determining that the one or more distribution criteria are satisfied, transmitting the certificate bundle to the network entities in a next certificate distribution subgroup.

E. Distribution Rules for Interface Entities.

Referring further to FIGS. 8A and 8B, in one example, a network entity that is an interface entity may be assigned to a certificate distribution group based on one or more distribution rules. In one example, a distribution rule may augment a partitioning of one or more interface entities to a certificate distribution group based on a network address of the particular interface entity. For example, the distribution rule may move interface entities that support a large number of overlay entities to a later portion of a distribution schedule. The distribution rule may serve to prevent an unsuccessful distribution to an interface entity from occurring early in the distribution schedule, particularly in the event that the interface entity supports a relatively large number of overlay entities.

In one example, a first certificate distribution group may be determined for a network entity, for example, based on one or more partitioning criteria, such as a network address of the particular network entity, and as second certificate distribution group may be determined for the network entity based on the one or more distribution rules. A first release phase corresponding to the first distribution group and second release phase corresponding to the second distribution group may be determined, and the network entity may be assigned to the distribution group corresponding to the later occurring of the first and second release phases.

7. Authenticating Network Entities

Network entities may utilize the CA certificates in a certificate bundle to authenticate other network entities associated with the virtual cloud network. For example, communications between network entities may be conducted according to a security protocol. The security protocol may include authenticating a network entity based on an entity certificate issued to the network entity by a CA, for example, prior to establishing communications with the network entity.

In one example, the entity certificate and a CA certificate corresponding to the CA that issued the entity certificate may represent at least a portion of a certificate chain. To authenticate the network entity, each signature-key pair in the certificate chain is validated. In one example, a top-level CA may issue the entity certificate, in which case the certificate chain may include one signature-key pair—that is, the digital signature of the top-level CA in the entity certificate, and the public key of the top-level CA. Such a top-level CA is sometimes referred to as a root CA. In another example, the certificate chain may include signature-key pairs corresponding to multiple CA certificates. For example, a root CA may issue an intermediate CA certificate to an intermediate CA, and the intermediate CA may issue the entity certificate to the network entity. In this case, the certificate chain includes two signature-key pairs—that is, (i) the digital signature of the intermediate CA in the entity certificate, and the public key of the intermediate CA; and (ii) the digital signature of the root CA in the intermediate CA certificate, and the public key of the root CA.

As used herein, the term "certificate authority certificate" or "CA certificate" refers to a digital certificate issued by a CA to establish its own identity and authenticity. A certificate authority certificate may be a root CA certificate or an intermediate CA certificate. A certificate authority certificate may be used to sign and issue other digital certificates, including those used for secure communication between network entities.

As used herein, the term "certificate authority" or "CA" refers to an entity responsible for issuing and managing digital certificates. The CA verifies the identity of network entities and digitally signs their certificates to attest to their authenticity.

As used herein, the term "root certificate authority certificate" or "root CA certificate" refers to a top-level CA certificate in a certificate chain or hierarchy. A root CA certificate may be self-issued and/or self-signed by a root CA. As used herein, the term "root CA" refers to a top-level CA in a CA hierarchy. A root CA may issue root CA certificates, intermediate CA certificates, or entity certificates.

As used herein, the term "intermediate certificate authority certificate" or "intermediate CA certificate" refers to an intermediate-level CA certificate in a certificate chain or hierarchy. An intermediate CA certificate may be issued by a root CA. An intermediate CA certificate is located between a root CA certificate and an entity certificate in a certificate chain or hierarchy. As used herein, the term "intermediate CA" refers to an intermediate-level CA in a CA hierarchy. An intermediate CA may issue entity certificates, for example, pursuant to authority granted to an intermediate CA according to a root CA.

As used herein, the term "entity certificate" refers to a digital certificate issued to an entity, such as a network entity associated with a virtual cloud network. An entity certificate may be used to verify the identity of the entity and enable secure communication between entities, such as between network entities in a virtual cloud network. An entity certificate may be issued by a CA, such as root CA or an intermediate CA.

In one example, an entity certificate may be an instance principal certificate. As used herein, the term "instance principal certificate" refers to a digital certificate used to authenticate and secure communication for an instance or VM associated with a virtual cloud network. In one example, instances and VMs may be created, scaled, and terminated dynamically. Instance principal certificates may be associated with an instance or VAM during its lifecycle and may be automatically generated and managed by the virtual cloud network infrastructure. An instance principal certificate may have limited access to communicate with certain network entities based on permissions assigned to the network entity to which the instance principal certificate is issued.

As used herein, the term "digital certificate" refers to a digitally signed electronic document that binds a public key to the identity of an entity. A digital certificate may conform to International Telecommunication Union standard X.509. A digital certificate may include an issuer's name, a certificate holder's name, a public key, issuer (CA) information, and expiration date. Digital certificates may be used in various security protocols, such as SSL/TLS, to establish the identity and authenticity of the communicating parties and facilitate secure communication.

8. Miscellaneous; Extensions

Embodiments are directed to a system with one or more devices that include a hardware processor and that are configured to perform any of the operations described herein and/or recited in any of the claims below. Embodiments are directed to a system including means to perform any of the operations described herein and/or recited in any of the claims below. In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer readable media comprising instructions which, when executed by one or more hardware processors, causes performance of operations comprising:

detecting a trigger condition to distribute a first certificate bundle comprising a first set of one or more certificate authority certificates;

partitioning each particular network entity of a plurality of network entities associated with a computer network into one of a plurality of certificate distribution groups based on a network address of the particular network entity, wherein each particular certificate distribution group comprises a corresponding subset of network entities from the plurality of network entities;

selecting a first certificate distribution group, of the plurality of certificate distribution groups, for distribution of the first certificate bundle, wherein the first certificate distribution group comprises a first subset of network entities; and transmitting, to the first subset of network entities, the first certificate bundle.

2. The media of claim 1, wherein partitioning each particular network entity into one of the plurality of certificate distribution groups comprises applying a randomization function to the network address of the particular network entity to determine a particular certificate distribution group of the plurality of certificate distribution groups for the particular network entity.

3. The media of claim 2, wherein partitioning each of the plurality of network entities into one of the plurality of certificate distribution groups comprises:

for a particular network entity of the plurality of network entities:

determining the network address of the particular network entity;

generating a hash value of the network address;

applying a modulo function to the hash value to determine a remainder;

selecting, from the plurality of certificate distribution groups, the particular certificate distribution group corresponding to the remainder, wherein a quantity of certificate distribution groups in the plurality of certificate distribution groups corresponds to a modulus base of the modulo function, wherein each particular certificate distribution group of the plurality of certificate distribution groups corresponds to a particular remainder from among the modulus base.

4. The media of claim 3, wherein each particular certificate distribution group of the plurality of certificate distribution groups includes a particular subset of network entities corresponding to one or more remainder values from among the modulus base.

5. The media of claim 4, wherein the plurality of certificate distribution groups are spread evenly or disproportionately across the modulus base.

6. The media of claim 4, wherein the first subset of network entities of the first certificate distribution group corresponds to a first set of one or more remainder values from among the modulus base, and wherein a second certificate distribution group, of the plurality of certificate distribution groups, includes a second subset of network entities corresponding to a second set of one or more remainder values, and wherein a first quantity of remainders in the first set of one or more remainder values is less than a second quantity of remainders in the second set of one or more remainder values.

7. The media of claim 6, wherein a difference between the first quantity and the second quantity corresponds to at least one of: an exponential function or a recursive function.

8. The media of claim 1, wherein the operations further comprise:

selecting a second certificate distribution group, of the plurality of certificate distribution groups, wherein the second certificate distribution group comprises a second subset of network entities;

subsequent to transmitting the first certificate bundle to the first subset of network entities, transmitting the first certificate bundle to the second subset of network entities.

9. The media of claim 8, wherein the operations further comprise:

subsequent to transmitting the first certificate bundle to the first subset of network entities, determining a distribution metric with respect to distribution of the first certificate bundle to the first subset of network entities;

determining that the distribution metric meets a distribution criterion; and responsive to the distribution metric meeting the distribution criterion, transmitting the first certificate bundle to the second subset of network entities.

10. The media of claim 9, wherein the distribution metric comprises an error count associated with transmitting the first certificate bundle to the first subset of network entities, the error count indicative of a number or a proportion of network entities from among the first subset of network entities with respect to which an error event associated with the first certificate bundle occurs during a verification period; and wherein the distribution criterion comprises the error count remaining below a threshold during the verification period.

11. The media of claim 9, wherein the distribution metric comprises a distribution count associated with transmitting the first certificate bundle to the first subset of network entities, the distribution count indicative of a number or a proportion of network entities from among the first subset of network entities with respect to which a distribution indicator indicates a successful distribution of the first certificate bundle; and wherein the distribution criterion comprises the distribution count meeting a threshold.

12. The media of claim 1, wherein the computer network comprises a virtual cloud network.

13. The media of claim 1, wherein the operations further comprise:

further partitioning the first certificate distribution group into a set of certificate distribution subgroups based on one or more successful distribution variables and/or based on one or more unsuccessful distribution variables, wherein each particular network entity corresponding to a particular certificate distribution subgroup of the set of certificate distribution subgroups is associated with a particular successful distribution variable and/or a particular unsuccessful distribution variable corresponding to the particular certificate distribution subgroup;

selecting a first certificate distribution subgroup, of the set of certificate distribution subgroups, wherein the first certificate distribution group comprises a first subgroup of network entities from among the first subset of network entities; and transmitting the first certificate bundle to the first subgroup of network entities.

14. The media of claim 1, wherein partitioning each of the plurality of network entities into one of the plurality of certificate distribution groups comprises:

receiving, from a first network entity associated with the computer network, a first request for certificate bundle distribution;

determining, based at least in part on a distribution schedule for distributing the first certificate bundle within the computer network, a second certificate distribution group corresponding to the first network entity and a first release phase for releasing the first certificate bundle for distribution to the second certificate distribution group, wherein the distribution schedule comprises (a) a set of certificate distribution groups, including the second certificate distribution group, and (b) a set of release phases, including the first release phase, for releasing the first certificate bundle for distribution to particular certificate distribution groups of the set of certificate distribution groups, wherein each particular certificate distribution group of the set of certificate distribution groups corresponds to a particular set of network addresses of the computer network, and wherein each particular release phase of the set of release phases corresponds to at least one certificate distribution group of the set of certificate distribution groups, and wherein the first release phase has commenced prior to having received the first request;

wherein selecting the first certificate distribution group comprises:

selecting the first certificate bundle for distribution to the first network entity based at least in part on the first release phase having commenced prior to receiving the first request; and wherein transmitting the first certificate bundle to the first subset of network entities comprises:

transmitting the first certificate bundle to the first network entity.

15. One or more non-transitory computer readable media comprising instructions which, when executed by one or more hardware processors, causes performance of operations comprising:

receiving, from a first network entity associated with a computer network, a first request for certificate bundle distribution;

determining, based at least in part on a distribution schedule for distributing a first certificate bundle within the computer network, a first certificate distribution group corresponding to the first network entity and a first release phase for releasing the first certificate bundle for distribution to the first certificate distribution group, wherein the distribution schedule comprises (a) a set of certificate distribution groups, including the first certificate distribution group, and (b) a set of release phases, including the first release phase, for releasing the first certificate bundle for distribution to particular certificate distribution groups of the set of certificate distribution groups, wherein each particular certificate distribution group of the set of certificate distribution groups corresponds to a particular set of network addresses of the computer network, wherein each particular release phase of the set of release phases corresponds to at least one certificate distribution group of the set of certificate distribution groups, and wherein the first release phase has commenced prior to having received the first request;

selecting the first certificate bundle for distribution to the first network entity based at least in part on the first release phase having commenced prior to receiving the first request, wherein the first certificate bundle comprises a first set of one or more certificate authority (CA) certificates; and transmitting the first certificate bundle to the first network entity.

16. The media of claim 15, wherein the operations further comprise:

receiving, from a second network entity associated with the computer network, a second request for certificate bundle distribution;

determining, based at least in part on the distribution schedule, a second certificate distribution group corresponding to the second network entity and a second release phase for releasing the first certificate bundle for distribution to the second certificate distribution group, wherein the set of certificate distribution groups includes the second certificate distribution group, and wherein the set of release phases includes the second release phase, and wherein the second release phase has yet to commence;

selecting a second certificate bundle for distribution to the first network entity, wherein the second certificate bundle is selected in lieu of the first certificate bundle based at least in part on the second release phase having yet to commence, wherein the second certificate bundle comprises a second set of one or more CA certificates, wherein the second set of one or more CA certificates differs from the first set of one or more CA certificates; and transmitting the second certificate bundle to the second network entity.

17. The media of claim 15, wherein determining the first certificate distribution group comprises applying a randomization function to a first network address of the first network entity.

18. The media of claim 15, wherein determining the first certificate distribution group comprises:

determining a first network address of the first network entity;

generating a first hash value of the first network address;

applying a modulo function to the first hash value to determine a first remainder;

selecting the first certificate distribution group based on the first remainder, wherein a quantity of certificate distribution groups in the set of certificate distribution groups corresponds to a modulus base of the modulo function, wherein each particular certificate distribution group of the set of certificate distribution groups corresponds to a particular remainder from among the modulus base.

19. The media of claim 18, wherein each particular certificate distribution group of the set of certificate distribution groups includes a particular subset of network entities corresponding to one or more remainder values from among the modulus base.

20. The media of claim 19, wherein the set of certificate distribution groups are spread evenly or disproportionately across the modulus base.

21. The media of claim 19, wherein the first certificate distribution group includes a first subset of network entities corresponding to a first set of one or more remainder values from among the modulus base, and wherein a second certificate distribution group, of the set of certificate distribution groups, includes a second subset of network entities corresponding to a second set of one or more remainder values, and wherein a first quantity of remainders in the first set of one or more remainder values is less than a second quantity of remainders in the second set of one or more remainder values.

22. The media of claim 21, wherein a difference between the first quantity and the second quantity corresponds to at least one of: an exponential function or a recursive function.

23. The media of claim 15, wherein the operations further comprise:

receiving, from a first interface entity associated with the computer network, a second request for certificate bundle distribution;

determining, based at least in part on the distribution schedule, a second certificate distribution group corresponding to the first interface entity and a second release phase corresponding to the second certificate distribution group, wherein the second release phase has commenced prior to having received the second request;

determining a first quantity of a plurality of overlay entities supported by the first interface entity;

determining, based at least in part on a distribution rule, a third certificate distribution group corresponding to the first interface entity, from among the set of certificate distribution groups in the distribution schedule, and a third release phase corresponding to the third certificate distribution group, wherein the distribution rule is based on a quantity of overlay entities supported by a particular interface entity, and the third release phase is subsequent to the second release phase;

assigning the first interface entity to the third certificate distribution group based on the third release phase being subsequent to the second release phase;

selecting a second certificate bundle for distribution to the first interface entity, wherein the second certificate bundle is selected in lieu of the first certificate bundle based at least in part on the third release phase being subsequent to the second release phase, wherein the second certificate bundle comprises a second set of one or more CA certificates, wherein the second set of one or more CA certificates differs from the first set of one or more CA certificates; and transmitting the second certificate bundle to the first interface entity.

24. The media of claim 15, wherein the operations further comprise:

transmitting the first certificate bundle to a first subset of network entities, wherein transmitting the first certificate bundle to the first subset of network entities includes transmitting the first certificate bundle to the first network entity;

determining a distribution metric with respect to distribution of the first certificate bundle to the first subset of network entities;

determining that the distribution metric meets a distribution criterion; and responsive to the distribution metric meeting the distribution criterion, commencing a second release phase for releasing the first certificate bundle for distribution to a second certificate distribution group corresponding to a second subset of network entities.

25. The media of claim 24, wherein the distribution metric comprises an error count associated with transmitting the first certificate bundle to the first subset of network entities, the error count indicative of a number or a proportion of network entities from among the first subset of network entities with respect to which an error event associated with the first certificate bundle occurs during a verification period; and wherein the distribution criterion comprises the error count remaining below a threshold during the verification period.

26. The media of claim 24, wherein the distribution metric comprises a distribution count associated with transmitting the first certificate bundle to the first subset of network entities, the distribution count indicative of a number or a proportion of network entities from among the first subset of network entities with respect to which a distribution indicator indicates a successful distribution of the first certificate bundle; and wherein the distribution criterion comprises the distribution count meeting a threshold.

27. The media of claim 15, wherein the operations further comprise:

prior to receiving the first request for certificate bundle distribution, detecting a trigger condition to distribute the first certificate bundle; and responsive to detecting the trigger condition, commencing the first release phase for releasing the first certificate bundle for distribution to the first certificate distribution group.

28. The media of claim 15, wherein the operations further comprise:

subsequent to transmitting the first certificate bundle to the first network entity, detecting a trigger condition to distribute a second certificate bundle comprising a second set of one or more CA certificates, wherein the second set of one or more CA certificates differs from the first set of one or more CA certificates;

responsive to detecting the trigger condition, commencing a second release phase, of the set of release phases in the distribution schedule, for releasing the second certificate bundle for distribution to a second certificate distribution group;

receiving, from a second network entity associated with the computer network, a second request for certificate bundle distribution;

determining, based at least in part on a second distribution schedule for distributing the second certificate bundle within the computer network, that the second network entity corresponds to the second certificate distribution group, wherein the second certificate distribution group corresponds to the second release phase, and wherein the second release phase has commenced prior to having received the second request;

selecting the second certificate bundle for distribution to the second network entity based at least in part on the second release phase having commenced prior to receiving the second request; and transmitting the second certificate bundle to the second network entity.

29. The media of claim 28, wherein the operations further comprise:

receiving, from a third network entity associated with the computer network, a third request for certificate bundle distribution;

determining, based at least in part on the distribution schedule, a third certificate distribution group corresponding to the third network entity and a third release phase for releasing the second certificate bundle for distribution to the third certificate distribution group, wherein the set of certificate distribution groups includes the third certificate distribution group, and wherein the set of release phases includes the third release phase, and wherein the third release phase has yet to commence;

selecting the first certificate bundle for distribution to the third network entity, wherein the first certificate bundle is selected in lieu of the second certificate bundle based at least in part on the third release phase having yet to commence; and transmitting the first certificate bundle to the third network entity.

* * * * *